(12) United States Patent
Jedele et al.

(10) Patent No.: US 10,865,840 B2
(45) Date of Patent: Dec. 15, 2020

(54) SUPPORT HIDDEN SLIDING CALIPER

(71) Applicant: Akebono Brake Industry Co., Ltd., Tokyo (JP)

(72) Inventors: Philip Nathanael Jedele, Ypsilanti, MI (US); Gang Lou, Rochester, MI (US)

(73) Assignee: Akebono Brake Industry Co., Ltd., Tokyo (JP)

( * ) Notice: Subject to any disclaimer, the term of this patent is extended or adjusted under 35 U.S.C. 154(b) by 33 days.

(21) Appl. No.: 16/369,799

(22) Filed: Mar. 29, 2019

(65) Prior Publication Data

US 2020/0132139 A1   Apr. 30, 2020

Related U.S. Application Data

(63) Continuation-in-part of application No. 16/170,405, filed on Oct. 25, 2018, now Pat. No. 10,781,872.

(51) Int. Cl.
*F16D 55/2265* (2006.01)
*F16D 65/00* (2006.01)
*F16D 55/00* (2006.01)

(52) U.S. Cl.
CPC ..... *F16D 55/2265* (2013.01); *F16D 65/0056* (2013.01); *F16D 65/0068* (2013.01); *F16D 65/0075* (2013.01); *F16D 2055/002* (2013.01); *F16D 2055/0008* (2013.01); *F16D 2055/0016* (2013.01)

(58) Field of Classification Search
CPC ............. F16D 65/0056; F16D 65/0068; F16D 65/0075; F16D 2055/0008; F16D 2055/0016; F16D 2055/002; F16D 2055/0033; F16D 55/2265
USPC ...... 188/71.1, 72.1, 72.4, 73.31, 73.9, 73.47
See application file for complete search history.

(56) References Cited

U.S. PATENT DOCUMENTS

| | | | |
|---|---|---|---|
| 4,031,986 A * | 6/1977 | Thompson | B60T 1/065 188/72.4 |
| 4,311,219 A | 1/1982 | Watanabe | |
| 4,401,194 A | 8/1983 | Klassen | |
| 4,574,922 A | 3/1986 | Varin et al. | |
| 4,926,979 A | 5/1990 | Odaka | |
| 4,964,490 A | 10/1990 | Watanabe | |
| 5,464,077 A * | 11/1995 | Thiel | F16D 55/227 188/72.5 |
| 5,526,904 A | 6/1996 | Walden | |
| 5,562,187 A | 10/1996 | Tribuzio et al. | |
| 5,860,496 A | 1/1999 | Kullman et al. | |
| 6,026,938 A | 2/2000 | Demoise, Jr. et al. | |

(Continued)

*Primary Examiner* — Thomas J Williams
(74) *Attorney, Agent, or Firm* — The Dobrusin Law Firm, P.C.; Bryan S. Lemanski

(57) ABSTRACT

A floating caliper brake assembly comprising: a caliper housing that is movable between a brake on position and a brake off position; a support bracket at least partially enclosed by the caliper housing and configured to extend around a rotor of a vehicle, the caliper housing being in communication with and movable relative to the support bracket, wherein the caliper housing has one or more fingers that extend radially downward and cover the support bracket so that when the brake assembly is viewed from an outboard side along an axis coaxial with, or substantially parallel to, an axis of rotation of the rotor the support bracket is obscured from view.

17 Claims, 12 Drawing Sheets

(56) References Cited

U.S. PATENT DOCUMENTS

| | | | |
|---|---|---|---|
| 6,131,706 A * | 10/2000 | Gotti | F16D 55/227 188/72.4 |
| D433,621 S | 11/2000 | Wiley | |
| 6,272,914 B1 * | 8/2001 | Ciotti | F16D 55/22655 188/11 |
| 7,144,142 B1 | 12/2006 | Suarez | |
| 7,234,568 B2 * | 6/2007 | Schorn | F16D 55/227 188/71.1 |
| 8,051,958 B1 | 11/2011 | Rockwell et al. | |
| 8,251,188 B2 | 8/2012 | Teper et al. | |
| 9,371,874 B2 | 6/2016 | Previtali et al. | |
| 9,394,954 B2 | 7/2016 | Smith et al. | |
| 9,551,387 B2 | 1/2017 | Smith et al. | |
| D790,417 S | 6/2017 | Bertone et al. | |
| 10,012,277 B2 | 7/2018 | Eash | |
| 10,054,175 B2 | 8/2018 | Kula et al. | |
| 2005/0258008 A1 | 11/2005 | King | |
| 2007/0051568 A1 | 3/2007 | Barbosa et al. | |
| 2008/0029356 A1 | 2/2008 | Halasy-Wimmer et al. | |
| 2008/0093181 A1 | 4/2008 | Waag et al. | |
| 2013/0095278 A1 | 4/2013 | Collura | |
| 2013/0199879 A1 | 8/2013 | Thompson et al. | |
| 2014/0116817 A1 | 5/2014 | Morais et al. | |
| 2018/0045257 A1 | 2/2018 | Eash | |

\* cited by examiner

SUPPORT HIDDEN SLIDING CALIPER

FIELD

The present teachings generally relate to a brake system, and more particularly, to a brake caliper assembly having a hidden support bracket.

BACKGROUND

Generally, brake systems are either a fixed caliper system where a fixed caliper is connected to a corner module or a floating caliper system where the caliper moves relative to a support bracket between a brake on position and a brake off position. The floating caliper system may move along one or more pins to move brake pads into contact with a rotor to create a braking force. Attempts have been made to cover an outboard side of the caliper by placing a cover over the caliper. The floating caliper systems are typically located inside of a support bracket so that the floating caliper is movable along or relative the support bracket.

Examples of brake systems are disclosed in U.S. Pat. Nos. D790,417; 4,401,194; 5,860,496; 6,026,938; 7,144,142; 9,371,874; and 10,012,277; and U.S. Patent Publication Nos. 2005/0258008; 2007/0051568; 2013/0095278; and 2018/0045257, all of which are incorporated by reference herein for all purposes. It would be attractive to have a brake system where a support bracket is located entirely within the caliper. What is needed is a brake system where the support bracket is entirely obscured by the caliper. It would be attractive to have a caliper that looks streamlined when viewed through a rim of a tire. What is needed is a caliper that has fingers that extend below a support bracket. It would be attractive to have a caliper housing that includes a recessed portion to receive a portion of the support bracket.

SUMMARY

The present teachings meet one or more of the present needs be providing: a floating caliper brake assembly comprising: a caliper housing that is movable between a brake on position and a brake off position; a support bracket at least partially enclosed by the caliper housing and configured to extend around a rotor of a vehicle, the caliper housing being in communication with and movable relative to the support bracket, wherein the caliper housing has one or more fingers that extend radially downward and cover the support bracket so that when the brake assembly is viewed from an outboard side along an axis coaxial with, or substantially parallel to, an axis of rotation of the rotor the support bracket is obscured from view.

The present teachings provide: a floating caliper brake assembly comprising: a caliper housing including: one or more fingers, one or more piston bores; an inner area located between the one or more fingers and the one or more piston bores; and a support bracket positioned entirely within the inner area of a caliper housing, the caliper housing being slidable relative to the support bracket, wherein an outboard portion of the support bracket is not visible when the brake assembly is viewed along an axis substantially perpendicular to one or more brake pad assemblies secured within the support bracket.

The present teachings provide: a floating caliper brake assembly comprising: a support bracket secured within a caliper housing, the caliper housing being slidably engaged to the support bracket, wherein an outboard portion of the support bracket is hidden by an outboard portion of the caliper housing when the brake assembly is viewed along an axis substantially perpendicular to one or more brake pad assemblies secured within the support bracket, and wherein the outboard portion of the caliper housing includes a recessed portion configured to receive the support bracket during movement of the caliper housing.

The present teachings provide a brake system where a support bracket is located entirely within the caliper. The present teachings provide a brake system where the support bracket is entirely obscured by the caliper. The present teachings provide a caliper that looks streamlined when viewed through a rim of a tire. The present teachings provide a caliper that has fingers that extend below a support bracket. The present teachings provide a caliper housing that includes a recessed portion to receives a portion of the support bracket.

DETAILED DESCRIPTION

Figure 1:
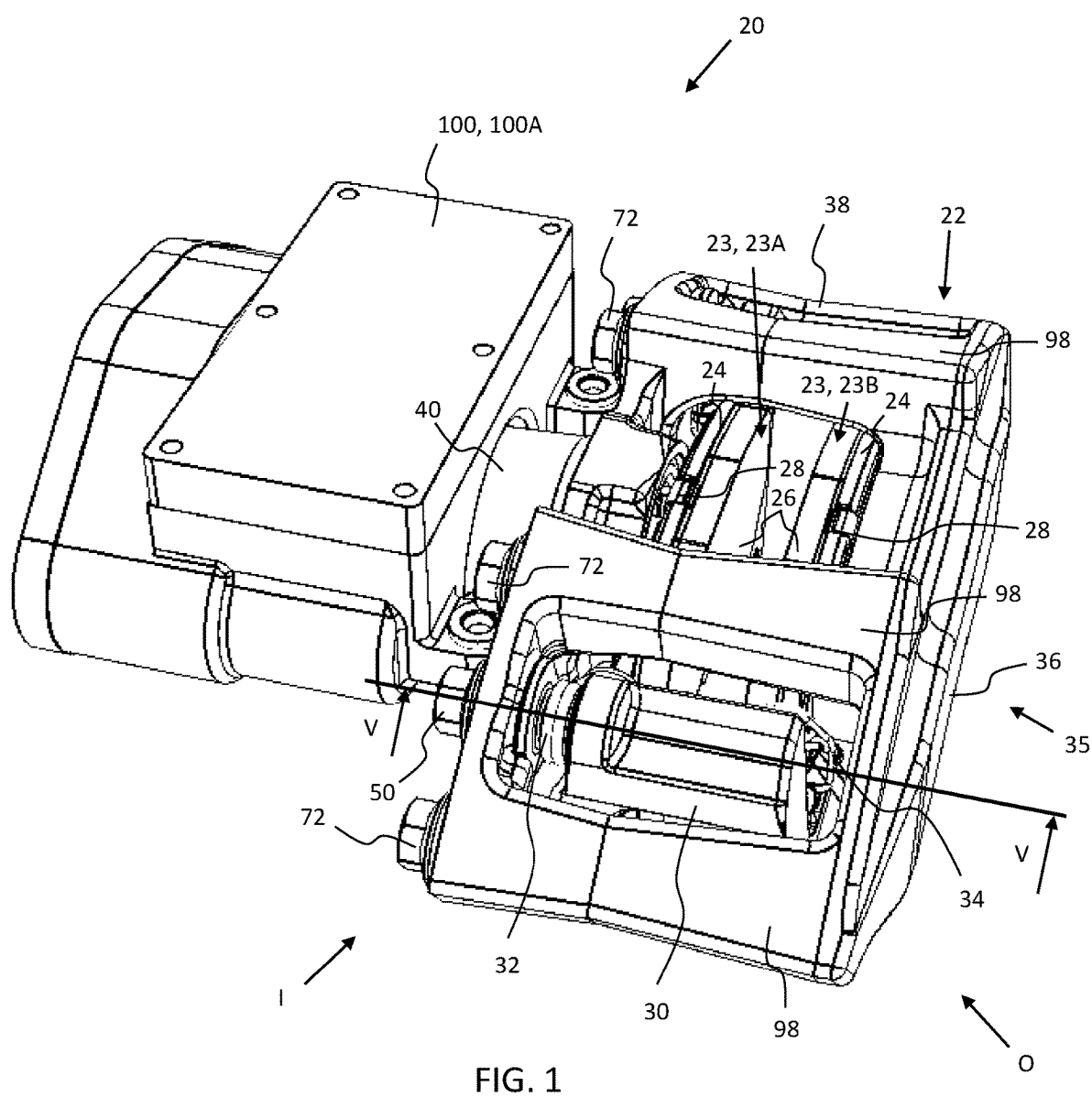
FIG. 1 is a perspective view of a brake assembly.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein relate to a brake assembly configured to decelerate a vehicle, such as a car, truck, bus, train, airplane, or a combination thereof. The brake assembly may also be integrated into components used for manufacturing or other equipment that require a brake for deceleration of one or more components, such as a lathe, amusement park rides, wind turbines, metal stamping presses, conveyor systems, or a combination thereof. The brake assembly may include one or more stationary components and/or one or more moving components. The one or more stationary components may include a support bracket, a caliper housing, one or more mounting features, one or more brake pad assemblies, one or more abutment features, or a combination thereof. The one or more moving components may include the caliper housing, one or more clips, one or more springs, one or more guide pins, one or more brake pads, one or more pistons, or a combination thereof. The brake assembly may be positioned around a moving component so that one or more brake pad assemblies engage a surface of the moving component, causing the moving component to decelerate. For example, a caliper housing may receive a rotor within an opening of the caliper housing so that one or more brake pad assemblies located within the caliper housing axially move relative to the rotor to provide a clamping force on opposing surfaces of the rotor. The brake assembly may be positioned behind a wheel of a vehicle mounting outboard of the rotor.

The brake assembly may include a leading end and a trailing end. The leading end may refer to an end where a point of the rotor passes through first during movement (i.e., the point of the rotor enters the brake assembly). Conversely, the trailing end may refer to an end where the point of the rotor passes through last during movement (i.e., after passing through the leading end when the rotor exits the brake assembly). The brake assembly may include one or more positions. The brake assembly may include a running position (i.e., an open position) that is a position of the brake assembly when the brake pad assemblies are disengaged from the rotor. The brake assembly may also include a clamping position (i.e., a closed position) that is a position of the brake assembly when the brake pad assemblies are engaged to the rotor and provide a clamping force on the rotor. The brake assembly may be in communication with a controller to electrically trigger activation (e.g., clamping) of the brake assembly. The brake assembly may be hydraulically activated by one or more hydraulic pressure lines. The brake assembly may include a caliper housing that is in communication with one or more brake pad assemblies.

The caliper housing may function to house one or more components of the brake assembly, such as one or more brake pad assemblies, abutment features, clips, springs, fasteners, or a combination thereof. The caliper housing may be in communication with the one or more components housed within the caliper housing. For example, the caliper housing may communicate with one or more brake pad assemblies to engage the one or more brake pad assemblies with a rotor of a vehicle. The caliper housing may include one or more pistons to drive one or more brake pad assemblies towards the rotor to create a clamping force. For example, the caliper may include an inboard piston and an outboard piston connected to an inboard and outboard brake pad assembly respectively for driving the brake pad assemblies towards the rotor (e.g., a fixed caliper). Alternatively, the caliper may include a single inboard piston to drive both an inboard brake pad assembly and an outboard brake pad assembly slidably engaged with the inboard brake pad assembly towards the rotor (e.g., a floating caliper having one or more guide pins). The pistons may be positioned in one or more piston bores of the caliper housing. The piston bores may be shaped substantially to receive one or more pistons.

The caliper housing may include one or more openings so that a portion of the rotor is positioned within the confines of the caliper housing. For example, the caliper housing may include an opening along a bottom portion to receive a rotor so that opposing brake pad assemblies are positioned on opposing sides of the rotor. The caliper housing may include a bridge to connect opposing segments or fingers of the caliper housing (e.g., an inboard side and an outboard side). For example, an inboard side of the caliper housing having a first brake pad assembly may be integrally connected to an opposing outboard side of the caliper housing having a second brake pad assembly via the bridge. The caliper housing may include one or more mounting points to receive one or more clips, one or more springs, other components, or a combination thereof. The caliper housing may be configured to package one or more components of the brake assembly. The one or more components packaged within the caliper housing may include one or more brake pad assemblies, clips, springs, pistons, abutment features, guide pins, support brackets (e.g., brackets that support and/or mount the brake assembly to the vehicle), or a combination thereof. For example, the caliper housing may include one or more holes that receive one or more guide pins of the brake assembly so that the caliper housing movably opposes a support bracket. The one or more holes may extend through a thickness of a wall of the caliper housing so that the guide pins extend through the caliper housing to connect the caliper housing to a support bracket. The one or more holes may be any size and shape to receive the guide pins and align the guide pins with one or more cavities of the support brackets.

The profile of the caliper housing may be configured based on packaging requirements within the vehicle, packaging requirements of components located within the caliper housing, or both. The caliper housing may be any geometry and size to accommodate a given application. The caliper housing may vary in size, shape, or both for packaging within a desired vehicle. The caliper housing may be integrally formed (i.e., monolithic), or may be a set of separate pieces joined together. For example, the caliper housing may be a pair of opposing pieces joined together via one or more fasteners, such as a bolt, screw, clip, pin, or a combination thereof. The caliper housing may include an interior contour substantially similar to one or more of the brake assembly components. For example, an interior surface of the caliper housing may be substantially similar to a shape of the support bracket, the one or more brake pad assemblies, or both so that the caliper housing may receive the one or more brake pad assemblies. The caliper housing may be free of any secondary plates, covers, shields, or a combination thereof. For example, the caliper housing may be integrally formed to obscure one or more components located within the caliper housing and free of any apertures that require a plate, cover, shield, or a combination thereof.

The caliper housing may include one or more fingers. The fingers may function to shield one or more components located within the caliper housing. The fingers may function to prevent excess debris or moisture from contacting the one or more components located within the caliper housing. The fingers may form a shape of the caliper housing, an interior cavity shape of the caliper housing, or both. The fingers may extend radially downward from one or more bridges of the caliper housing. The fingers may extend radially downward from one or more portions of the caliper housing to cover one or more components positioned within the caliper housing. The fingers be joined via one or more bridges of the caliper housing. The bridges may extend substantially perpendicular to the fingers to interconnect portions of the fingers to create the overall caliper housing. The fingers may be monolithically formed with the caliper housing. The fingers may extend to obscure one or more components positioned within the caliper housing. For example, the fingers may obscure a support bracket, one or more brake pad assemblies, one or more pad clips, or a combination thereof from view along an axis substantially coaxial with, or substantially parallel to, an axis of rotation of a rotor positioned within the brake assembly. The fingers may form side portions of the brake assembly. The side portions of the brake assembly may be portions of the brake assembly that are interconnected via one or more bridges and extend partially or substantially parallel to a contact surface of the rotor (i.e., a surface engaged by the brake pad assemblies).

The fingers may be any size and shape to contain one or more components located within the caliper housing. The fingers may include one or more sections, one or more portions, or both. The fingers may include one or more arcuate portions, one or more planar portions, one or more contours, one or more undulations, one or more steps, one or more flanges, one or more bends, one or more recesses, one or more depressions, one or more projections, one or more curves, one or more extensions, or a combination thereof. The fingers may be coextensive with one or more components of the brake assembly, such as the support bracket.

The fingers may include a body portion. The body portion may function to shield one or more components located within the caliper housing. The body portion may function to prevent excess debris or moisture from contacting the one or more components located within the caliper housing. The body portion of one or more fingers may be interconnected via the bridges. The body portion may be configured to receive one or more components located within the caliper housing. For example, the body portion may substantially receive a support bracket movably connected to the body portion of the caliper housing. The body portion may form an inner cavity of the caliper housing that houses the support bracket, one or more brake pad assemblies, other components, or a combination thereof. The body portion may obscure a portion of one or more components located in the caliper housing, such as the support bracket from view from one or more viewpoints when viewed from an outboard side of the brake assembly. The one or more viewpoints may be a viewpoint substantially perpendicular to one or more brake pad assemblies positioned within the caliper housing. The one or more viewpoints may be a viewpoint substantially coaxial with, or substantially parallel to, an axis of rotation of the rotor positioned within the caliper housing. The body portion may obscure about 20% or more, about 30% or more, or about 40% or more of the support bracket when viewed from an outboard side of the brake assembly. The body portion may obscure about 100% or less, about 90% or less, or about 80% or less of the support bracket when viewed from an outboard side of the brake assembly. The body portion may obscure an outboard portion of the support bracket, an inboard portion of the support bracket, an intermediate portion of the support bracket, or a combination thereof. The body portion may be monolithically formed with the one or more bridges of the caliper housing. The body portion may be about 30% or more, about 40% or more, or about 50% or more of a finger. The body portion may be about 100% or less, about 90% or less, or about 80% or less of a finger.

The body portion may be connected to one or more additional portions of the caliper housing. The body portion may be connected to the one or more bridges, one or more extended portions, one or more projected portions, one or more recessed portions, one or more intermediate portions, or a combination thereof. For example, the body portion may be configured to be an intermediate portion between the one or more bridges and an extended portion.

The body portion may include an extended portion. The extended portion may function to extend a finger a desired length to shield one or more components located within the caliper housing. The extended portion may be any extension of the body portion of the caliper housing. The extension may be a projection, an elongation, a protrusion, or a combination thereof of the body portion. The extended portion may increase an overall height of the finger. A height of the finger or caliper housing may be measured from an uppermost portion of the finger or caliper housing located above (i.e., opposing a position of the rotor nearest to the ground) a rotor positioned within the caliper housing to a bottommost portion of the finger or caliper housing on an opposing end of the finger or caliper housing. The extended portion may increase a height of the finger or caliper housing by about 10% or more, about 20% or more, or about 30% or more. The extended portion may increase a height of the finger or caliper housing by about 60% or less, about 50% or less, or about 40% or less. The extended portion may be monolithically formed with the body portion. The extended portion may extend the body portion and be uniformly shaped with the body portion. Alternatively, the extended portion may extend from the body portion and have a shape that differs from the body portion. For example, the body portion may have a substantially arcuate convex shape while the extended portion extends from the body portion in a substantially planar manner. The extended portion may have a height that is greater than, less than, or equal to a height of the body portion.

The extended portion, alone or in conjunction with the body portion or one or more additional portions of the finger, may obscure a support bracket located within the caliper housing. The extended portion may obscure an outboard side of the support bracket, an inboard side of the support bracket, or both when viewed from an outboard side of the brake assembly. The extended portion may obscure about 10% or more, about 20% or more, or about 30% or more of the support bracket when viewed from an outboard side of the brake assembly. The extended portion may obscure about 60% or less, about 50% or less, or about 40% or less of the support bracket when viewed from an outboard side of the brake assembly. The extended portion may be coextensive with the support bracket. The extended portion, alone or in conjunction with the body portion, may obscure an entire outboard side of the support bracket, an inboard side of the support bracket, or both. The outboard side and inboard side may be bisected by a plane extending through rotor substantially perpendicular to an axis of rotation of the rotor. The outboard side and the inboard side may be referred to as the outer and inner bisected portions respectively of the support bracket based on their proximity to a body of the vehicle. The extended portion may form one or more peripheral edges of the caliper housing. The extended portion may include one or more chamfered edges, one or more filets, or both. The extended portion may include one or more rounded edges. The extended portion and the body portion may form an overall inner area of the caliper housing that receives the support bracket, one or more additional components, or a combination thereof. Accordingly, the caliper housing may receive about 40% or more, about 50% or more, or about 60% or more of the support bracket. The caliper housing may receive about 100% or less, about 90% or less, or about 80% or less of the support bracket.

The extended portion may include a recessed portion. The recessed portion may function to receive a portion of the support bracket during movement of the caliper housing relative to the support bracket. The recessed portion may be located along an inner surface of the recessed portion that faces the rotor. The recessed portion may receive the support bracket in a running position of the brake assembly, in a clamping position of the brake assembly, in an intermediate position of the brake assembly, or a combination thereof. For example, during a clamping operation, the caliper housing may slidably move towards a fixed support bracket so that, when the brake pad assemblies contact and compress the rotor within the caliper housing, the recessed portion receives a portion of the support bracket. After clamping is completed and the rotor is released, the caliper housing may slidably move away from the support bracket, thereby releasing the support bracket from the recessed portion. When the support bracket is positioned in the recessed portion, a gap may be present between a surface of the recessed portion and the support bracket. The gap may be about 1 mm or more, about 2 mm or more, or about 3 mm or more. The gap may be about 6 mm or less, about 5 mm or less, or about 4 mm or less. A gap may not be present. For example, the support bracket may be received by the recessed portion and abut (i.e., contact) a surface of the recessed portion. The recessed portion may be recessed any amount from an inner surface of the finger. The recessed portion may be recessed from an inner surface of the finger about 10 mm or more, about 20 mm or more, or about 30 mm or more. The recessed portion may be recessed from an inner surface of the finger about 60 mm or less, about 50 mm or less, or about 40 mm or less. The recessed portion may extend from one or more peripheral edges of the extended portion. The recessed portion may be positioned anywhere along an inner surface of the extended portion. The recessed portion may be positioned along an inner surface of the body portion, another portion of the finger, the extended portion, or a combination thereof.

The recessed portion may abut one or more ribs located along an inner surface of the finger. The ribs may function to abut the support bracket, one or more brake pad assemblies, or both in a running position of the brake assembly, in a clamping position of the brake assembly, in an intermediate position of the brake assembly, or a combination thereof. The ribs may abut the one or more brake pad assemblies to maintain a position of the brake pad assemblies and prevent unwanted movement away from the rotor. For example, the ribs may abut an outer surface of the brake pad assemblies that prevents the brake pad assemblies from moving in a direction away from the rotor. The ribs may have a desired height. The height may be about 5 mm or more, about 10 mm or more, or about 15 mm or more. The height may be about 30 mm or less, about 25 mm or less, or about 20 mm or less. There may be about 2 or more ribs, about 3 or more ribs, or about 4 or more ribs. There may be about 8 or less ribs, about 7 or less ribs, or about 6 or less ribs. The ribs may include one or more bends, one or more arcuate portions, one or more planar portions, or a combination thereof. The ribs may include one or more substantially flat surfaces. The ribs may project substantially perpendicular to an axis of rotation of the rotor. The ribs may project substantially orthogonal to an inner surface of the finger. The ribs may project at an angle other than orthogonal to the inner surface of the finger.

The ribs may include a cutout. The cutout may function to receive one or more components of the brake assembly. The cutout may function to receive one or more components located within the caliper housing during movement of the caliper housing. The cutout may provide structurally integrity. The cutout may be positioned anywhere along the ribs. The ribs may include a plurality of cutouts. The cutout may be any desired size and shape. The cutout may have one or more open portions, one or more closed portions, or both. For example, the cutout may have a substantially crescent or half-moon shape, or may be shaped substantially like a circular hole.

The ribs may form a hollow region. The hollow region may function to receive one or more components of the brake assembly. The hollow region may function to form an inner body of the caliper housing. The hollow region may function to increase an interior area of the caliper housing. The hollow region may be formed of one or more ribs, one or more projections, one or more extensions, or a combination thereof. The hollow region may be any size and shape. The hollow region may be recessed from an inner surface of the finger. The hollow region may be recessed a similar distance to the recessed portion or may be recessed a different distance. The hollow region may be free of contact with any components of the brake assembly. The hollow region may house one or more components of the brake assembly. The hollow region may be positioned anywhere along an interior side of the finger. The hollow region may extend through a thickness of the caliper housing and form a through-hole.

The brake assembly may include one or more brake pad assemblies. The one or more brake pad assemblies may function to engage a rotor of the vehicle. The one or more brake pad assemblies may be configured to provide a clamping force on the rotor. The one or more brake pad assemblies may be in communication with the caliper housing or additional components to move the one or more brake pad assemblies. For example, the one or more brake pad assemblies may be in communication with one or more pistons located within the caliper housing to move the one or more brake pad assemblies towards the rotor, away from the rotor, or both. The one or more brake pad assemblies may move substantially axially relative to an axis of rotation of the rotor so that an engaging surface (e.g., a friction material) of the one or more brake pad assemblies is substantially parallel with a surface of the rotor, a rotor plane, or both. A plurality of one or more brake pad assemblies may be in communication to create a clamping force on the rotor. For example, a first brake pad assembly and an opposing second brake pad assembly may clamp opposing sides of the rotor to decelerate the vehicle. The first and second brake pad assemblies may move towards and away from the rotor. Alternatively, the first brake pad assembly may be stationary while the second brake pad assembly moves towards and away from the rotor, or vice versa (e.g., the caliper housing may be a fixed caliper housing or an opposed caliper housing). The one or more brake pad assemblies may include a friction material, a pressure plate, one or more abutment features, one or more springs, one or more clips, or a combination thereof.

A pair of opposing brake pad assemblies may be positioned on opposing sides of a rotor. For example, an inboard and an outboard brake pad assembly may maintain a gap between the brake pad assemblies when in a released position so that a portion of the rotor may be positioned within the gap. When the brake pad assemblies are applied (i.e., clamped), the gap between the brake pad assemblies decreases until the friction material of the brake pad assemblies contacts opposing sides of the rotor and creates a clamping force to decelerate the vehicle. When deceleration is complete, the opposing brake pad assemblies are retracted (i.e., released), and the gap between the brake pad assemblies increases substantially back to its initial position.

The one or more brake pad assemblies may be in communication with the caliper housing via a pressure plate. The pressure plate may function to structurally support one or more friction materials of the brake pad assembly. The pressure plate may be in communication with the caliper housing to move the brake pad assembly towards the rotor, away from the rotor, or both. For example, the pressure plate may be affixed to the caliper housing so that, when the caliper housing is driven by one or more pistons, the caliper housing extends and retracts the pressure plate, thereby extending and retracting the brake pad assembly. The pressure plate may be in communication with one or more ribs of the finger. The pressure plate may include one or more attachment points to receive one or more clips, one or more springs, other components, or a combination thereof. The pressure plate may include one or more openings to interface with one or more abutment features (e.g., one or more guide pins) of the brake assembly. The pressure plate may include one or more ears protruding from a peripheral edge, surface, or both of the pressure plate. The one or more openings, the one or more ears, or both may interface with one or more abutment features of the brake assembly to guide the one or more brake pad assemblies during movement and contact the rotor with the friction material. The pressure plate may have a shape substantially similar to one or more friction materials, or may be dissimilar.

One or more friction materials may be disposed on, and joined to, a surface of the pressure plate. The friction materials may function to provide a clamping force on a rotor of the brake system. For example, the one or more friction materials may be disposed on a surface of the pressure plate so that the one or more friction materials are positioned between the pressure plate and the rotor, thereby allowing the one or more friction materials to contact the rotor. The one or more friction materials may be adhered, mechanically fastened, or both to the pressure plate. The one or more friction materials may be integrally formed with the pressure plate. A plurality of pressure plates may support a single friction material, or a plurality of friction materials may be supported by a single pressure plate. The friction material, the pressure plate, or both may be engaged by one or more shims.

The shim may function to bias the brake pad assemblies to prevent vibration and unwanted movement of the brake pad assemblies during braking operations. The shim may be positioned between the brake pad assemblies and the caliper housing, support bracket, or both. The shim may prevent noise, such as squeaking or squealing, resulting from rattling of the brake pad assemblies. The shim may have a shape substantially similar to the friction material, the pressure plate, or both. The shim may be made from one or more metals, polymers, or both. The shim may be made from one or more materials configured to pad the brake pad assemblies during operation. For example, the shim may be a rubber pad positioned between the brake pad assemblies and the caliper housing. The shim may be adhesively secured to the brake pad assemblies, caliper housing, support bracket, or a combination thereof. The shim may be secured to the brake pad assemblies, caliper housing, support bracket, or a combination thereof via one or more fasteners, such as a bolt, screw, pin, clip, or a combination thereof. The shim may be used in conjunction with one or more pad clips.

The pad clip may function to communicate between the friction material, the pressure plates, or both and one or more additional components of the brake assembly. The pad clip may function to communicate between the brake pad assembly and a corresponding portion of the caliper housing, or vice versa. The pad clip may be placed between the brake pad assembly and the caliper housing to maintain communication within the abutment interface (i.e., the interface between the abutment feature and the caliper housing). The pad clip may have one or more legs, one or more arms, or both. The pad clip may include a bridge extending between the one or more legs, one or more arms, or both. The pad clip may substantially conform to the shape of the abutment feature so that the pad clip attaches to the abutment feature. For example, the pad clip may be substantially shaped like an ear of the pressure plate so that the pad clip attaches to the ear, and the assembly of the pad clip and the ear are inserted into a channel of the caliper housing to guide the brake pad assembly during application and retraction. The pad clip may include one or more angles, one or more contoured portions, one or more projections, or a combination thereof. The pad clip may be used in conjunction with one or more top clips, one or more retraction springs, or both. The pad clip may be placed between the brake pad assembly and one or more additional components of the brake assembly, such as a support bracket that supports the brake pad assembly. The pad clip may be used in conjunction with one or more pad springs.

The one or more pad springs may function to aid in release of one or more brake pad assemblies from a clamping position. The pad springs may be secured to the one or more brake pad assemblies. The pad springs may provide a biasing force on the one or more brake pad assemblies. For example, the pad springs may provide a biasing force on the one or more brake pad assemblies in a direction substantially opposing a clamping direction of the one or more brake pad assemblies to aid in retraction of the one or more brake pad assemblies. The pad springs may have one or more elastic portions, one or more inelastic portions, or both. The pad springs may be elastically deformed so that, after deformation, the pad springs may substantially return to an original position, original shape, or both. The pad springs may secure to a pressure plate of the brake pad assemblies.

The brake assembly may include a support bracket. The support bracket may function to support one or more components of the brake assembly. The support bracket may function to align the caliper housing to one or more brake pad assemblies, a rotor, or both. The support bracket may support one or more brake pad assemblies, the caliper housing, or a combination thereof. The support bracket may include one or more tie bars. The support bracket may be free of tie bars. The support bracket may be aligned with the caliper housing via one or more guide pins so that opposing brake pad assemblies are also aligned. The support bracket may extend around all or a portion of the rotor. The support bracket may include an inboard side, an outboard side, or both. The inboard side, the outboard side, or both may be received by one or more portions of the caliper housing during movement of the caliper housing. For example, the recessed portion of the caliper housing may receive a portion of the outboard side of the support bracket during a clamping operation where the caliper housing moves towards the support bracket. The support bracket may be substantially or entirely contained within the confines of the caliper housing. For example, an area of the support bracket may be less than an area of an inner cavity of the caliper housing so that the support bracket may be positioned entirely within the inner cavity of the caliper housing. The support bracket may be obscured from view by the caliper housing when viewed from an outboard side. The support bracket may be obscured from view by the rotor. For example, an outboard portion of the support bracket may be obscured from view by the caliper housing while an inboard portion of the support bracket may be obscured from view by the rotor when viewed from a viewpoint substantially coaxial with, or substantially parallel to, an axis of rotation of the rotor.

The support bracket may include one or more cavities to receive one or more guide pins. The cavities may be any size and shape to receive the one or more guide pins. The cavities may extend through a portion of the support bracket or an entire thickness of the support bracket. The cavities may have a length greater than a length of a portion of the guide pin being received so that the guide pin may freely move within the cavity. The guide pins may move freely within the cavity via a force exerted by one or more pistons.

The support bracket may include a depressed region. The depressed region may function to recess one or more holes of the support bracket. The depressed region may function to abut one or more mounting portions of a vehicle. The depressed region may be positioned anywhere along the support bracket. The depressed region may be positioned on an inboard side of the support bracket, an outboard side of the support bracket, or both. The depressed region may be free of contact with the one or more brake pad assemblies. The depressed region may receive one or more fasteners, one or more guide pin assemblies, or both. The depressed region may contain one or more holes that receive the one or more fasteners, one or more guide pin assemblies, or both. The depressed region may be free of any holes. The depressed region may be positioned near an outer periphery of the support bracket so that the depressed region does not obstruct movement of the caliper housing, one or more brake pad assemblies, or both. The depressed region may be an extension of a body of the support bracket. The support bracket may include a plurality of depressed regions. For example, the support bracket may include depressed regions on opposing ends of the support bracket. A first depressed region may be positioned near a trailing end of the support bracket while a second depressed region may be positioned near a leading end of the support bracket. The depressed region may have one or more structural supports, such as a gusset, rib, projection, extension, or a combination thereof.

The depressed region may be positioned adjacent to a raised region. The raised region may function to recess one or more holes of the support bracket. The raised region may function to abut one or more mounting portions of a vehicle. The raised region may be positioned anywhere along the support bracket. Each raised region may be adjacent to a depressed region. The support bracket may include a plurality of raised regions. The plurality of raised regions may be located near the plurality of depressed regions. The raised region may include one or more holes. The one or more holes may be positioned near one or more holes of the depressed region. A distance between the one or more holes of the raised region and the one or more holes of the depressed region may be about 2 mm or more, about 5 mm or more, or about 10 mm or more. The distance between the one or more holes of the raised region and the one or more holes of the depressed region may be about 20 mm or less, about 15 mm or less, or about 12 mm or less. The raised region may be located closer to the rotor than the depressed region. The raised region may be located farther from the rotor than the depressed region.

The support bracket may include a tie bar. The tie bar may function to interconnect one or more portions of the support bracket. The tie bar may function to increase structural integrity of the support bracket. The tie bar may interconnect one or more projections of the support bracket. For example, the tie bar may interconnect a first projection positioned near a leading end of the support bracket to a second projection positioned near a trailing end of the support bracket. The tie bar may be positioned on an outboard portion of the support bracket, an inboard portion of the support bracket, or both. The tie bar may extend substantially parallel to a longitudinal axis of the caliper housing, the support bracket, or both. The tie bar may extend along an axis that forms any angle with the longitudinal axis of the caliper housing. The tie bar may be positioned adjacent to one or more brake pad assemblies. The tie bar may be received by one or more portions of the caliper housing during a braking operation, a release operation, or both. For example, the tie bar may be received by a recessed portion of the caliper housing when a gap between the caliper housing and the support bracket is decreased. The tie bar may be monolithically formed with the support bracket. The tie bar may include one or more bends, one or more planar portions, one or more arcuate portions, or a combination thereof. The tie bar may be positioned around one or more portions of one or more brake pad assemblies. The tie bar may be may be positioned entirely within an inner cavity of the caliper housing. The tie bar may be obscured from view by the caliper housing when viewed from an outboard side. For example, the tie bar may be obscured from view by the caliper housing when viewed from a viewpoint substantially coaxial with, or substantially parallel to, an axis of rotation of the rotor.

The piston may function to drive one or more brake pad assemblies. The piston may contact a pressure plate of the brake pad assembly to drive the friction material towards the rotor. The piston may be housed within the caliper housing. Alternatively, the piston may be housed within a separate piston housing abutting the caliper housing. The piston may hydraulically actuated, electromechanically actuated, or both. The piston may be any size and shape to drive the one or more brake pad assemblies. The piston may be a plurality of pistons to drive one or more brake pad assemblies. The piston may drive a brake pad assembly secured to the caliper housing so that the caliper housing moves relative to an opposing support bracket via one or more guide pins secured to the caliper housing and movably received by the support bracket.

The piston may be driven by a drive unit. The drive unit may function to drive the piston into one or more brake pad assemblies. The drive unit may be secured to the caliper housing so that the drive unit is in communication with the piston. The drive unit may be a direct drive unit. The drive unit may be an indirect drive unit. The drive unit may be a hydraulic unit. The drive unit may be an electromechanical unit. The drive unit may contain one or more gears, one or more pulleys, one or more belts, one or more chains, or a combination thereof. The drive unit may contain a gearbox. The drive unit may be a motor gear unit (MGU). The drive unit may be gearless. The drive unit may receive one or more electrical currents. As such, the drive unit may contain a motor that receives a direct current (DC), an alternating current (AC), or both. The drive unit may drive the piston into contact with a brake pad assembly so that the caliper housing moves along one or more guide pins secured to the caliper housing.

The guide pin assembly may function to secure, align, or both a guide pin relative to the caliper housing, the support bracket, or both. The guide pin assembly may be configured to mount the guide pin to the caliper housing and extend the guide pin into a cavity of the support bracket so that the caliper housing movably opposes the support bracket, or vice versa. As such, a brake pad assembly of the caliper housing may move relative to a brake pad assembly of the support bracket to provide a clamping force on a rotor positioned between the brake pad assemblies. The guide pin assembly may include a sleeve, a guide pin, or both. The guide pin assembly may be configured to ensure proper alignment of the caliper housing relative to the support bracket to prevent lockup caused by misalignment during operation of the brake assembly. For example, a sleeve of the of the guide pin assembly may receive a guide pin and position the guide pin relative to the caliper housing, the support bracket, or both.

The sleeve may function to secure a guide pin within a hole of the caliper housing, the support bracket, or both. The sleeve may receive a portion of the guide pin to position the guide pin relative to the caliper housing, the support bracket, or both. The sleeve may be positioned in a hole of the caliper housing, the support bracket, or both prior to insertion of the guide pin. Alternatively, the sleeve may be secured to the guide pin and the guide pin assembly (i.e., the guide pin and the sleeve) may be mounted in the brake assembly. The sleeve may have an interior channel that is shaped to receive the guide pin. For example, the guide pin may be substantially cylindrical in shape and the sleeve may include a cylindrical channel that receives the guide pin. The sleeve may fixedly secure the guide pin in a desired position. For example, the sleeve may include an internal threading that mates to a threading of the guide pin so that the guide pin remains in a desired position during operation of the brake assembly. Alternatively, the sleeve may be free of an internal threading and secure the guide pin via a press-fit condition. The sleeve may be any size and shape configured to be secured in a hole of the caliper housing, the support bracket, or both. The sleeve may be any size and shape configured to receive the guide pin. The sleeve may be compressible, flexible, or rigid. The sleeve may have a portion that is compressible while having another portion that is structurally rigid. The sleeve may include an internal hole that extends between opposing ends of the sleeve so that the guide pin may extend through the sleeve. The internal hole may include a friction modifier, such as a lubricant, to aid in movement of the guide pin in the hole. A single sleeve may secure a guide pin or a plurality of sleeves may secure a single guide pin.

The sleeve may include a flange. The flange may function to abut a surface of the caliper housing, the support bracket, or both when the sleeve is inserted into a hole of the caliper housing, the support bracket, or both. The flange may function to aid in securing the sleeve in the caliper housing, the support bracket, or both. The flange may have a diameter greater than the diameter of the remaining sleeve. For example, the flange of the sleeve may have a diameter that is about 25% larger or more, about 50% or more, or about 75% or more. The flange of the sleeve may have a diameter that is about 150% or less, about 125% or less, or about 100% or less. The flange may be received in a cutout portion of the caliper housing, the support bracket, or both so that a surface of the flange is substantially coplanar with a surface of the caliper housing, the support bracket, or both after insertion of the sleeve into a hole of the caliper housing, the support bracket, or both.

The flange may include a protruding surface. The protruding surface may function to abut a surface of the caliper housing, the support bracket, or both when the sleeve is inserted into a hole of the caliper housing, the support bracket, or both. The protruding surface surround an internal hole of the sleeve. For example, the protruding surface may be substantially circular so that the protruding surface encircles an opening of the hole of the sleeve. The protruding surface may be positioned anywhere along a surface of the flange. The protruding surface may be considered any undulation or contour on a surface of the flange. The protruding surface may be integrally formed with the sleeve. The protruding surface may include an abrasive surface to increase friction between the flange and the caliper housing, the support bracket, or both. The protruding surface may be configured to maintain a position of the sleeve relative to the support bracket, the caliper housing, or both in conjunction with one or more flat edges of the sleeve.

The flat edges of the sleeves may function to prevent rotation of the sleeve relative to the caliper housing, the support bracket, or both. For example, the flange may be received in a cutout of the caliper housing after the sleeve is inserted into a hole of the caliper housing, the support bracket, or both that is shaped substantially similar to the flange to prevent rotation. The flat edges may be located anywhere along an outer edge of the flange. The flat edges may be a chamfered surface. The flat edges may be a flat cutout of the outer peripheral edge of the flange. The flat edges may be a pair of opposing flat edges located on opposing sides of the sleeve. The flat edges may form any angle with the peripheral edge shape of the flange.

The sleeve may also include a groove. The groove may function to receive and secure a boot configured to enclose a portion of the guide pin. The groove may be located along a body of the sleeve so that the boot may be extended over the sleeve and received by the groove. The groove may be any size and shape configured to receive the boot. The groove may be integrally formed with the sleeve. The groove may include a lip having a diameter greater than the groove to create a friction fit with the boot. The groove may be positioned anywhere axially along the sleeve to receive the boot during assembly, after assembly, or both. For example, the groove may extend from a flange of the sleeve so that the boot, once secured to the sleeve, abuts an end face of the flange.

Additionally, the guide pin may include a groove. The groove may function to receive and secure a boot configured to enclose a portion of the guide pin. The groove may be similar to the groove of the sleeve or may be different. The groove may be located along a shaft portion of the guide pin so that the boot may be extended over the guide pin and received by the groove. The groove may be any size and shape configured to receive the boot. The groove may be integrally formed with the guide pin. The guide pin and the sleeve may both include a groove. Alternatively, the pin may include a groove and the sleeve may be free of a groove, or vice versa. The groove may be positioned anywhere axially along the sleeve to receive the boot during assembly, after assembly, or both. For example, the groove may be positioned along the shaft portion of the guide pin so that, after the guide pin is inserted into the sleeve, the groove remains exposed to secure the boot.

The boot may function to protect the guide pin during application. The boot may encompass a portion of the guide pin during a braking application, during a release application, before application, after application, or a combination thereof. The boot may be positioned around a portion of the guide pin exposed during movement so that debris, moisture, or both are substantially prevented from contacting the guide pin. The boot may protect a shaft portion of the guide pin. The boot may protect about 15% or more of the guide pin, about 30% or more of the guide pin, or about 45% or more of the guide pin. The boot may protect about 90% or less of the guide pin, about 75% or less of the guide pin, or about 60% or less of the guide pin. The boot may be secured to a groove of the guide pin, a groove of the sleeve, or both. The boot may be compressible so that, as the guide pin extends into a cavity of the support bracket, the boot compresses and remains between a surface of the cavity and the sleeve. The boot may be elastic so that, as the guide pin extends out of the cavity of the support bracket, the boot may elastically extend to encompass the guide pin.

The guide pin may function to slidably connect the caliper housing to the support bracket. The guide pin may function to movably secure one or more opposing brake pads of the brake assembly. The guide pin may be fixedly secured to the caliper housing and movably secured to the support bracket, or vice versa. For example, the guide pin may be secured in a hole of the caliper housing via the sleeve and extend into a cavity of the support bracket so that the caliper housing may axially move relative to the support bracket, or vice versa. The guide pin may include a head portion, a shaft portion, an engaging portion, or a combination thereof. The guide pin may be structurally rigid. For example, the guide pin may be structurally rigid to support a weight of the support bracket, the caliper housing, or both. The guide pin may be any desired size and shape. The guide pin may be configured to mate with the sleeve. For example, the guide pin may include an engaging portion that is received by a hole of the sleeve.

The engaging portion may function to secure the guide pin to the sleeve, the caliper housing, the support bracket, or a combination thereof. The engaging portion may be positioned anywhere along the guide pin. For example, the engaging portion may abut a head portion of the guide pin so that, when the engaging portion is received by a hole of the sleeve, the sleeve abuts the head portion. The engaging portion may include one or more engaging features to secure the guide pin to the sleeve, the caliper housing, the support bracket, or a combination thereof. For example, the engaging portion may include one or more threads the mate to one or more internal threads of the sleeve. Alternatively, the engaging portion may be substantially smooth and create a press-fit condition when inserted into a hole of the sleeve. The engaging portion may be configured to permanently secure the guide pin to the sleeve, the caliper housing, the support bracket, or a combination thereof (i.e., the guide pin may be damaged, destroyed, or both during removal). The engaging portion may be configured to removably secure the guide pin to the sleeve, the caliper housing, the support bracket, or a combination thereof so that the guide pin may be removed from the caliper housing, the support bracket, or a combination thereof free of damage. The engaging portion may include one or more adhesives to bond the guide pin to the sleeve, the caliper housing, the support bracket, or a combination thereof. The engaging portion may abut the shaft of the guide pin. The engaging portion and the shaft may a substantially uniform shape or may be different. For example, the engaging portion may have a diameter greater than a diameter of the shaft so that the shaft may extend through the sleeve prior to mating to the engaging portion.

The engaging portion may be located along a shaft portion of the guide pin. The shaft portion may function to movably connect the guide pin to the caliper housing, the support bracket, or both. The shaft portion may function to fixedly secure the guide pin to the caliper housing, the support bracket, the sleeve, or a combination thereof. For example, the shaft portion may include an engaging portion to fixedly secure the guide pin to the sleeve and also include a shaft the movably secures the guide pin to the support bracket. The shaft portion may include the engaging portion, a shaft, or both. The shaft portion may abut a head portion of the guide pin. The shaft portion may be configured to at least partially extend through a hole of the sleeve, a hole of the caliper housing, or a hole of the support bracket, or a combination thereof.

The shaft portion may include a shaft. The shaft may function to movably engage the guide pin to the support bracket, the caliper housing, or both. The shaft may be received by a cavity of the support bracket, the caliper housing, or both. The shaft may be any size and shape to be received by the support bracket, the caliper housing, or both. The shaft may have a length substantially similar to a length of the cavity of the support bracket, the caliper housing, or both. Alternatively, the shaft may have a length less than a length of the cavity of the support bracket, the caliper housing, or both so that the shaft may freely extend into the cavity (i.e., the shaft does not bottom out by abutting an end of the cavity). The shaft may be substantially uniform and extend along an axis of the guide pin so that the shaft may extend into the cavity of the support bracket, the caliper housing, or both. The shaft may include a friction modifier along an exterior surface so decrease friction between the shaft and the cavity. The friction modifier may be a lubricant, grease, oil, graphite powder, silicone, or a combination thereof. The shaft may be free of a friction modifier.

The shaft may include one or more notches. The notches may function to reduce suction between the shaft and the cavity. The notches may extend along a length of the shaft. the notches may extend along an entire length of the shaft or only a portion of the shaft. For example, the notches may extend along about 15% or more of the shaft, about 30% or more of the shaft, or about 45% or more of the shaft. The notches may extend along about 90% or less of the shaft, about 75% or less of the shaft, or about 60% or less of the shaft. The notches may extend from a distal end of the shaft. The notches may be integrally formed with the shaft. For example, the notches may be a chamfered surface along the shaft or a cutout portion of the shaft. The notches may include a channel to allow fluid movement when the shaft is inserted into the cavity. The notches may be any size and shape that reduces suction between the shaft and the cavity. The notches may reduce suction by about 15% or more, about 30% or more, or about 45% or more. The notches may reduce suction by about 90% or less, about 75% or less, or about 60% or less. The notches may be positioned along a first end portion of the guide pin that opposes a head portion.

The head portion of the guide pin may function to determine a position of the guide pin during assembly, after assembly, or both. The head portion may be configured to abut one or more surfaces of the sleeve, the caliper housing, the support bracket, or a combination thereof and prevent movement in a desired direction. For example, the head portion may about a surface of a hole of the caliper housing after the shaft of the guide pin has been inserted through the hole. The head portion may include a head of the guide pin. The head portion may include a flange. The flange may abut a surface of the support bracket, the sleeve, the caliper housing, or a combination thereof. The flange may have a diameter that is greater than a hole of the sleeve, the caliper housing, the support bracket, or a combination thereof so that the flange prevents further insertion of the guide pin into the hole. The head portion may be integrally formed with the guide pin. The head portion may abut the shaft portion of the guide pin. For example, the head portion may abut the engaging portion of the guide pin.

The head portion may include a head. The head may function to allow a user to install the guide pin in the caliper housing, the sleeve, the support bracket, or a combination thereof. The head may be configured to drive the guide pin into the caliper housing, the support bracket, or a combination thereof. For example, the head portion may be shaped so that a user may screw the guide pin into the sleeve using a socket. The head portion may be shaped substantially like a shape of a bolt so that a user may install the guide pin using one or more tools. The head portion may be a full-bearing shape, square shape, hexagonal, slotted, countersunk, round, pan shaped, or a combination thereof. The head portion may be configured to receive a screwdriver head (e.g., Philips, flathead, or both), a socket wrench, a hex key wrench, or a combination thereof. The head may be structurally rigid to prevent shearing of the guide pin during torque application. For example, the guide pin may be structurally rigid to allow the guide pin to be screwed into an internal threading of the sleeve.

The head may abut a flange. The flange may function to abut a surface of the caliper housing, the support bracket, the sleeve, or a combination thereof when the guide pin is inserted into a hole of the caliper housing, the support bracket, the sleeve, or a combination thereof. The flange may function to aid in securing the guide pin in the caliper housing, the support bracket, the sleeve, or a combination thereof. The flange may have a diameter greater than the diameter of the remaining guide pin. For example, the flange may have a diameter that is about 25% larger or more, about 50% or more, or about 75% or more relative to the guide pin. The flange may have a diameter that is about 150% or less, about 125% or less, or about 100% or less relative to the guide pin. The flange may be received in a cutout portion of the caliper housing, the support bracket, or both so that a surface of the flange is substantially coplanar with a surface of the caliper housing, the support bracket, or both after insertion of the guide pin into a hole of the caliper housing, the support bracket, the sleeve, or a combination thereof.

Turning now to the figures, FIG. 1 illustrates a perspective view of a brake assembly 20. The brake assembly 20 includes a pair of opposing brake pad assemblies 23 housed within a caliper housing 22. The brake assembly 20 has an inboard side (I) and an outboard side (O). The caliper housing 22 includes a body portion 38 and an extended portion 36 that form a finger 35 of the caliper housing 22. The inboard side (I) and the outboard side (O) of the body portion 38 are connected by a plurality of bridges 98. The caliper housing 22 includes a plurality of fasteners 72 to secure sections of the caliper housing 22 to each other. The caliper housing 22 is supported by a plurality of guide pin assemblies 50 secured to the caliper housing 22 and slidably engaged to a support bracket 30 located within the caliper housing 22 (see FIG. 5). Each brake pad assembly 23 includes a friction material 26 disposed on a pressure plate 24 and aligned via a shim 28. The brake pad assemblies 23 oppose one another so that, as a piston 40 engages a first brake pad assembly 23A, the first brake pad assembly 23A moves towards a rotor (not shown). Once the first brake pad assembly 23A engages the rotor, the caliper housing 22 slides along the plurality of guide pin assemblies 50 so that a second brake pad assembly 23B pushed by the caliper housing 22 moves toward an opposing side of the rotor, thereby providing a clamping force on the rotor between the brake pad assemblies 23. As the piston 40 releases engagement of the first brake pad assembly 23A, the first brake pad assembly 23A moves back towards its original starting position and is aided in retraction by a pad clip 34 (see FIG. 5). The brake pad assemblies 23 are secured within the support bracket 30. The brake pad assemblies 23 are configured to slide within the support bracket 30 while the caliper housing 22 moves via the plurality of guide pin assemblies 50 secured to the caliper housing 22 and extending into the support bracket 30. Each guide pin assembly 50 also extends through a boot 32 positioned between the caliper housing 22 and the support bracket 30. Additionally, the piston 40 is located within the caliper housing 22 and connected to a drive unit 100 that is a motor gear unit (MGU) 100A.

Figure 2:
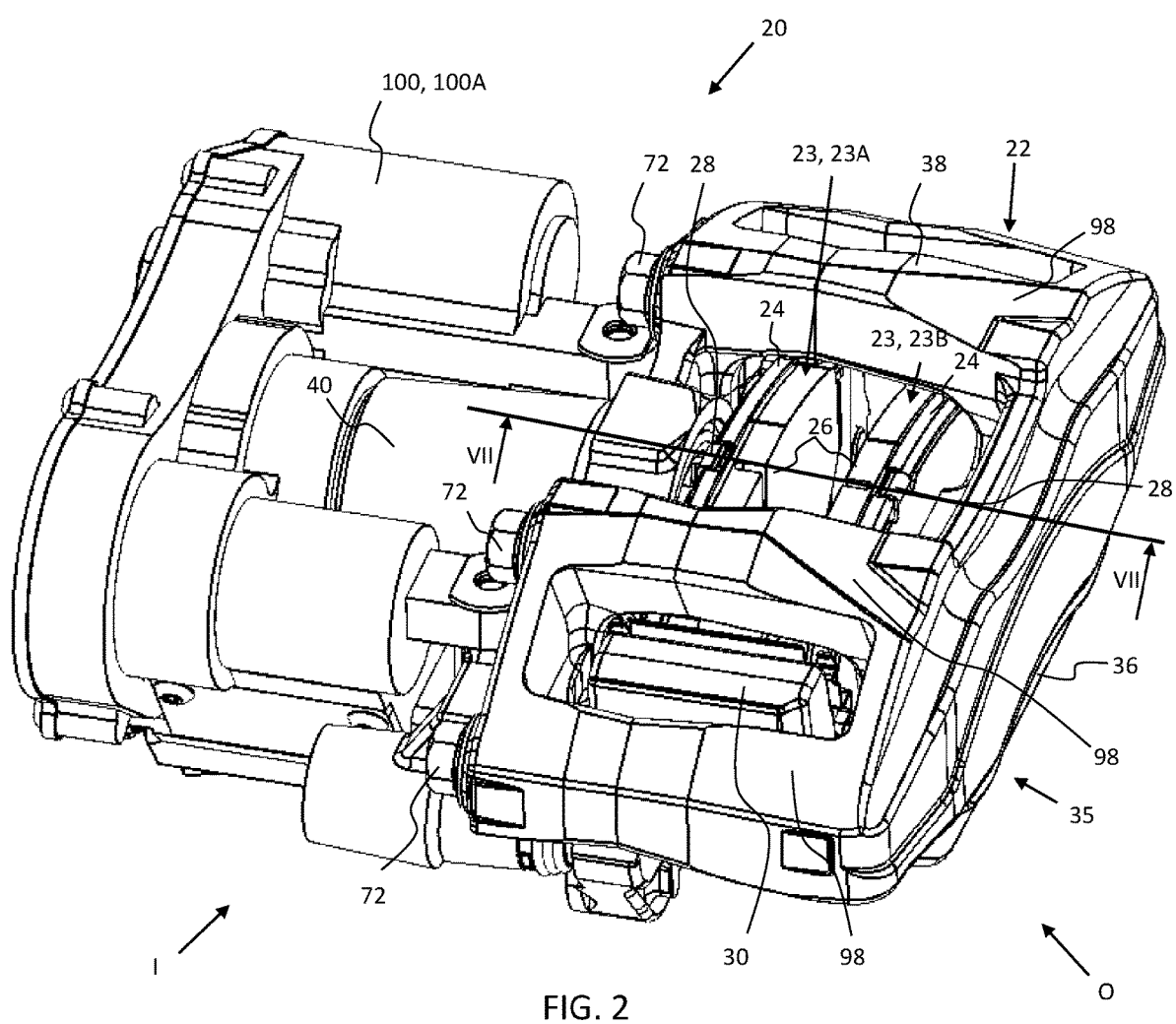
FIG. 2 is a perspective view of a brake assembly.

FIG. 2 illustrates a perspective view of a brake assembly 20. The brake assembly 20 includes a pair of opposing brake pad assemblies 23 housed within a caliper housing 22. The brake assembly 20 has an inboard side (I) and an outboard side (O). The caliper housing 22 includes a body portion 38 and an extended portion 36 that form a finger 35 of the caliper housing 22. The inboard side (I) and the outboard side (O) of the body portion 38 are connected by a plurality of bridges 98. The caliper housing 22 includes a plurality of fasteners 72 to secure sections of the caliper housing 22 to each other. The caliper housing 22 is supported by a plurality of guide pin assemblies secured to a support bracket 30 located within the caliper housing 22 and slidably engaged to the caliper housing 22 (see FIG. 6). Each brake pad assembly 23 includes a friction material 26 disposed on a pressure plate 24 and aligned via a shim 28. The brake pad assemblies 23 oppose one another so that, as a piston 40 engages a first brake pad assembly 23A, the first brake pad assembly 23A moves towards a rotor (not shown). Once the first brake pad assembly 23A engages the rotor, the caliper housing 22 slides along the plurality of guide pin assemblies so that a second brake pad assembly 23B pushed by the caliper housing 22 moves toward an opposing side of the rotor, thereby providing a clamping force on the rotor between the brake pad assemblies 23. As the piston 40 releases engagement of the first brake pad assembly 23A, the first brake pad assembly 23A moves back towards its original starting position. The brake pad assemblies 23 are secured within the support bracket 30. The brake pad assemblies 23 are configured to slide within the support bracket 30 while the caliper housing 22 moves via the plurality of guide pin assemblies secured to the support bracket 30 and extending into the caliper housing 22. Additionally, the piston 40 is located within the caliper housing 22 and connected to a drive unit 100 that is a motor gear unit (MGU) 100A.

Figure 3:
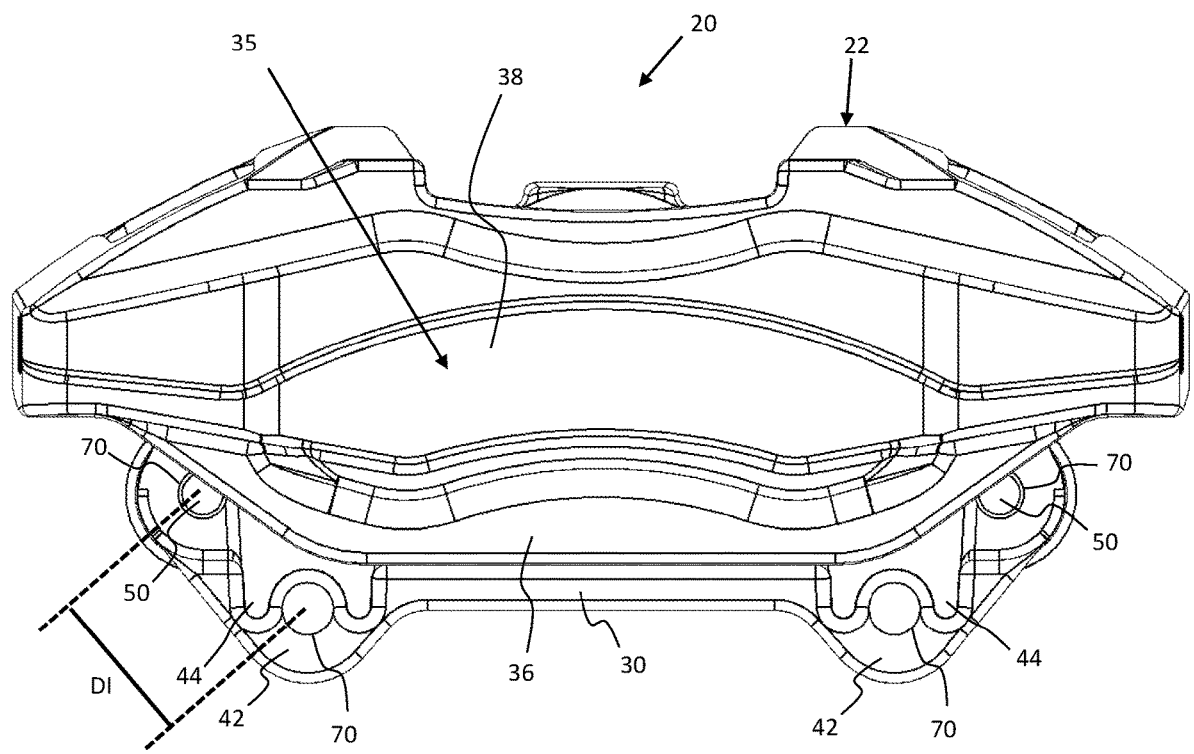
FIG. 3 is an outboard side view of a brake assembly.
Figure 4:
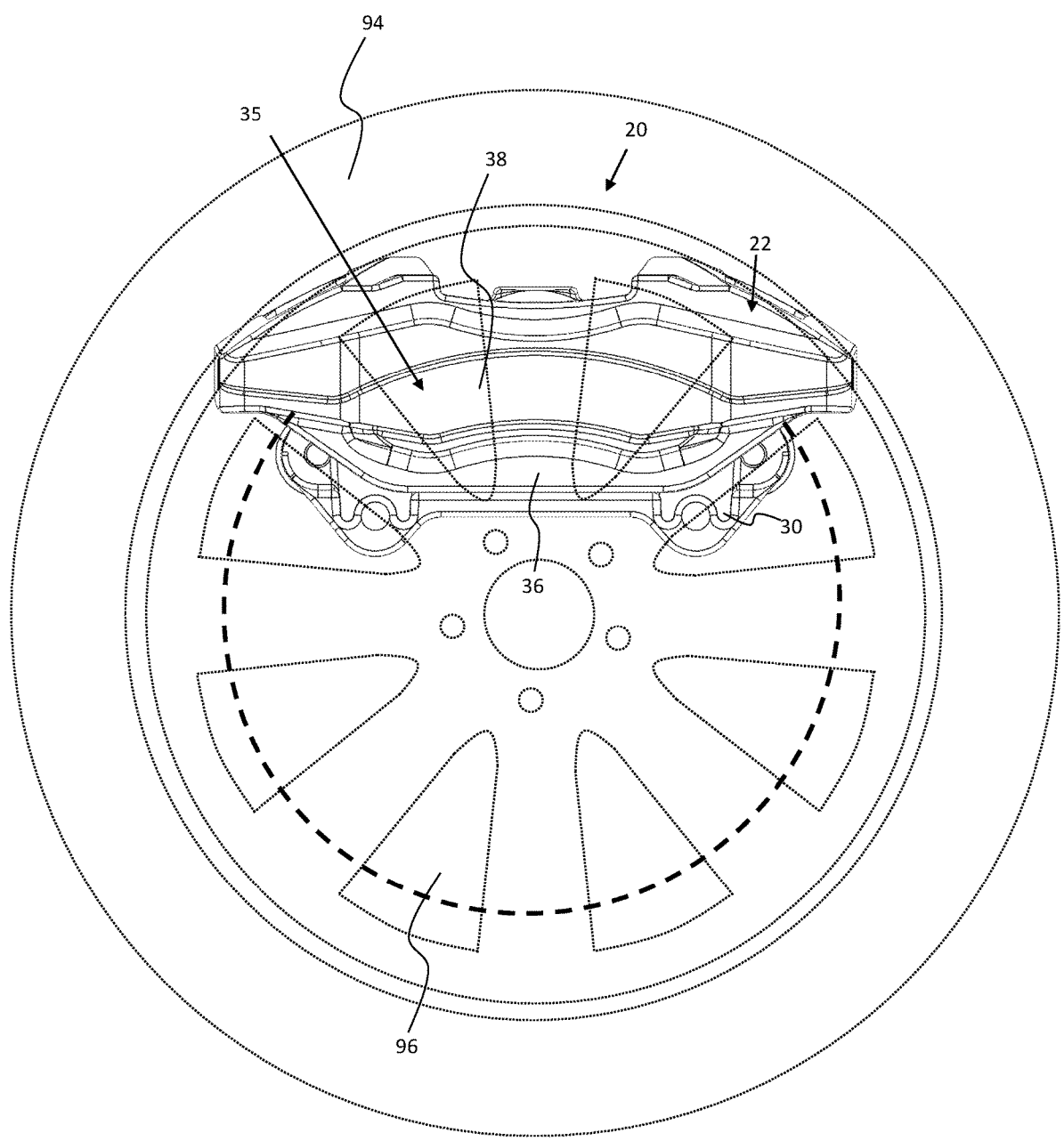
FIG. 4 is an outboard side view of a brake assembly secured around a rotor of a wheel.

FIGS. 3 and 4 illustrate an outboard side view of a brake assembly 20. The brake assembly 20 includes a caliper housing 22. The caliper housing 22 includes a finger 35. The finger 35 includes a body portion 38 having an extended portion 36 extending from a bottom of the body portion 38. The extended portion 36 is configured to hide an outboard side of a support bracket 30 positioned within the caliper housing 22. As illustrated, the outboard side of the support bracket 30 is not visible when viewed from an outboard side of the brake assembly 20 along an axis substantially coaxially with, or parallel to, an axis of rotation of a rotor 96. The support bracket 30 includes a plurality of holes 70 configured to receive one or more guide pin assemblies 50, one or more fasteners (see FIG. 2), or both. The plurality of holes 70 may be located on raised region 44 of the support bracket 30, a depressed region 42 of the support bracket 30, or both. As shown, the plurality of holes 70 may be spaced apart by a desired distance (DI).

As shown in FIG. 4, the brake assembly 20 may be mounted behind a wheel 94 of a vehicle so that the brake assembly is positioned to receive a portion of the rotor 96 connected to the wheel 94. The rotor 96 may be positioned between opposing brake pad assemblies of the brake assembly 20 so that the brake pad assemblies may provide a clamping force on the rotor 96. As illustrated, the extend portion 36 of the caliper housing 22 hides the outboard side of the support bracket 30 while the rotor 96 hides the inboard side of the support bracket 30 when viewed from an outboard side of the brake assembly 20 along an axis substantially coaxially with, or parallel to, an axis of rotation of a rotor 96. The outboard side of the support bracket 30 may be a portion of the support bracket 30 positioned on an outboard side of the rotor 96 while an inboard side of the support bracket 30 may be a portion of the support bracket 30 positioned on an inboard side of the rotor 96 (see FIGS. 5 and 7).

Figure 5:
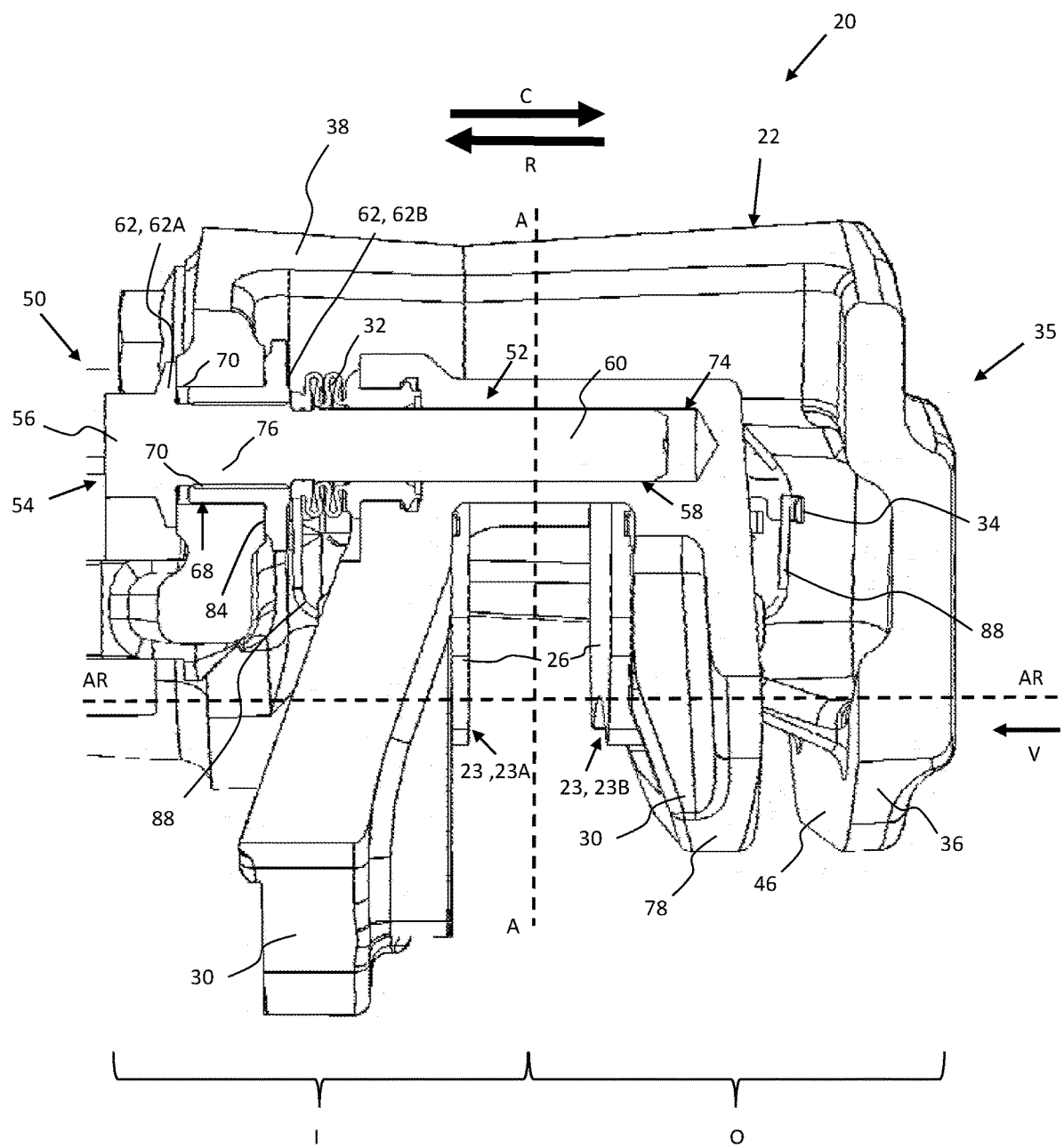
FIG. 5 is cross-sectional view V-V of FIG. 1.

FIG. 5 illustrates cross-sectional view V-V of the brake assembly 20 of FIG. 1. The brake assembly 20 includes a pair of opposing brake pad assemblies 23 housed within a caliper housing 22. The caliper housing 22 includes a body portion 38 and an extended portion 36 that form a finger 35 of the caliper housing 22. The caliper housing 22 is supported by a plurality of guide pin assemblies 50 slidably engaged to a support bracket 30 located within the caliper housing 22. As illustrated, the extended portion 36 extends beyond the body portion 38 so that an outboard side (O) of the support bracket 30, including a tie bar 78 of the support bracket 30, is not visible when viewed (V) from an outboard side (O) of the brake assembly 20 along an axis (AR) substantially coaxially with, or parallel to, an axis of rotation of a rotor. It should be noted that an inboard side (I) of the support bracket 30 may also be hidden from the aforementioned viewpoint by a rotor positioned between the inboard side (I) and the outboard side (O) of the support bracket 30 along axis (A). The extended portion 36 further includes a recessed portion 46 facing the rotor and configured to receive a portion of the support bracket 30 during movement of the caliper housing 22. Each brake pad assembly 23 includes a friction material 26 disposed on a pressure plate and aligned via a shim, a pad clip 34, or both (see FIG. 1). The brake pad assemblies 23 oppose one another so that, as a piston engages a first brake pad assembly 23A, the first brake pad assembly 23A moves towards a rotor (not shown) in a clamping direction (C). Once the first brake pad assembly 23A engages the rotor, the caliper housing 22 slides along the plurality of guide pin assemblies 50 so that a second brake pad assembly 23B pushed by the caliper housing 22 moves toward an opposing side of the rotor, thereby providing a clamping force on the rotor between the brake pad assemblies 23. As the piston releases engagement of the first brake pad assembly 23A, the brake pad assemblies 23 move back toward their original starting position, whereby the first brake pad assembly 23A moves in a release position (R) via a plurality of pad springs 88. The brake pad assemblies 23 are secured within the support bracket 30. The brake pad assemblies 23 are configured to slide within the support bracket 30. Each guide pin assembly 50 extends through a boot 32 positioned between the caliper housing 22 and the support bracket 30. Each guide pin assembly 50 includes a guide pin 52 extending through a hole 70 of a sleeve 68 into a cavity 74 of the support bracket 30. The guide pin 52 includes a head portion 54 integrally formed with a shaft portion 58. The head portion 54 includes a head 56 and a flange 62A such that the head portion 54 may abut a peripheral edge of the sleeve 68, a surface of the caliper housing 22, or both. The shaft portion 58 includes a shaft 60 that extends into the cavity 74 of the support bracket 30. The shaft portion 58 also includes an engaging portion 76 that may engage an inner surface of the sleeve 68 once inserted into the hole 70 of the sleeve 68 (e.g., the engaging portion 76 may be threaded to mate with an internal threading of the sleeve 68). The sleeve 68 also includes a flange 62B such that the sleeve 68 may be inserted into a hole 70 of the caliper housing 22 and a protruding surface 84 of the flange 62B may abut a surface of the caliper housing 22. As shown, the flanges 62, specifically the flange of the guide pin 52 and the flange of the sleeve 68, may abut opposing surfaces of the caliper housing 22.

Figure 6A:
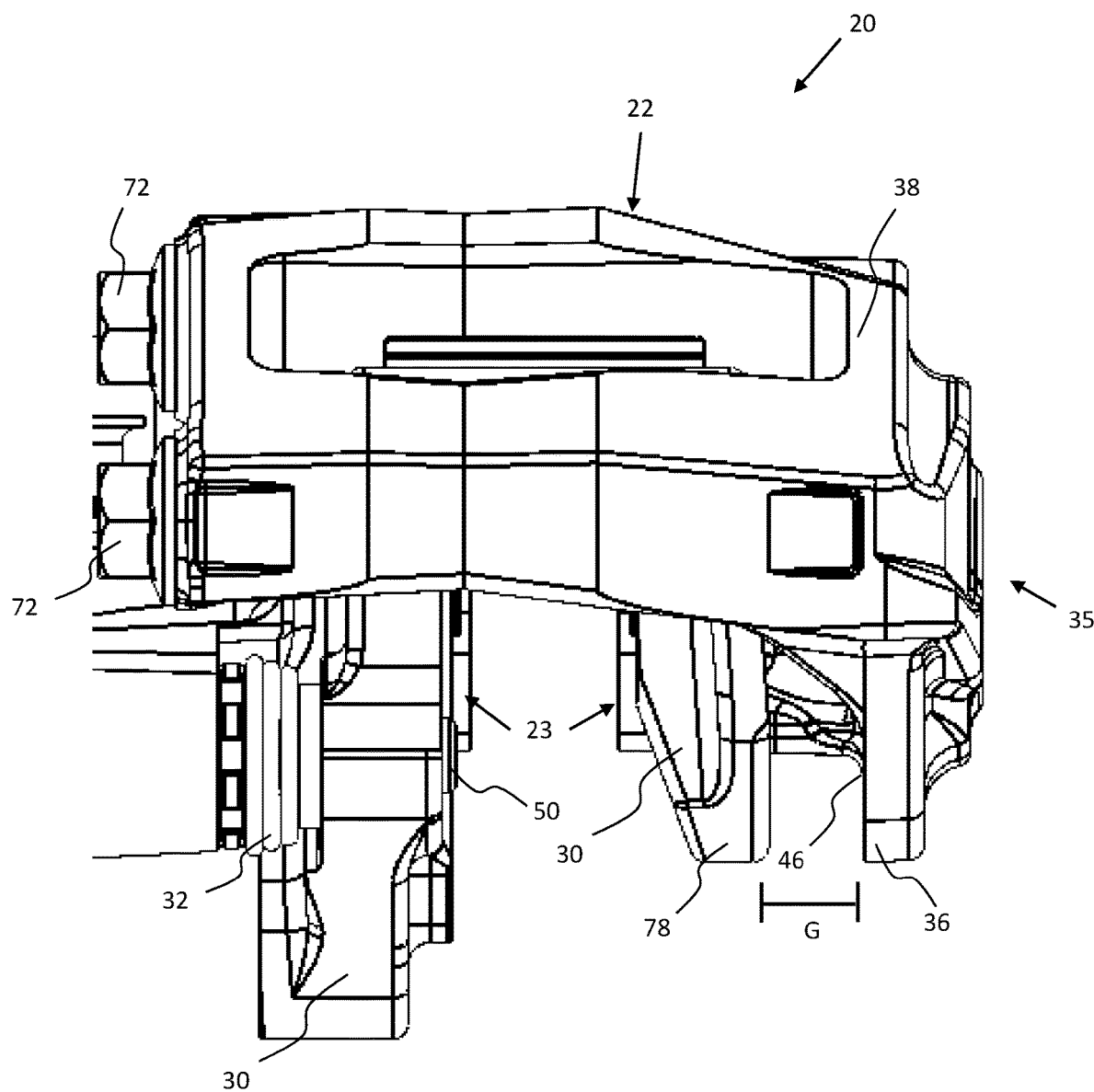
FIG. 6A is a side view of the brake assembly of FIG. 2 in a running position.
Figure 6B:
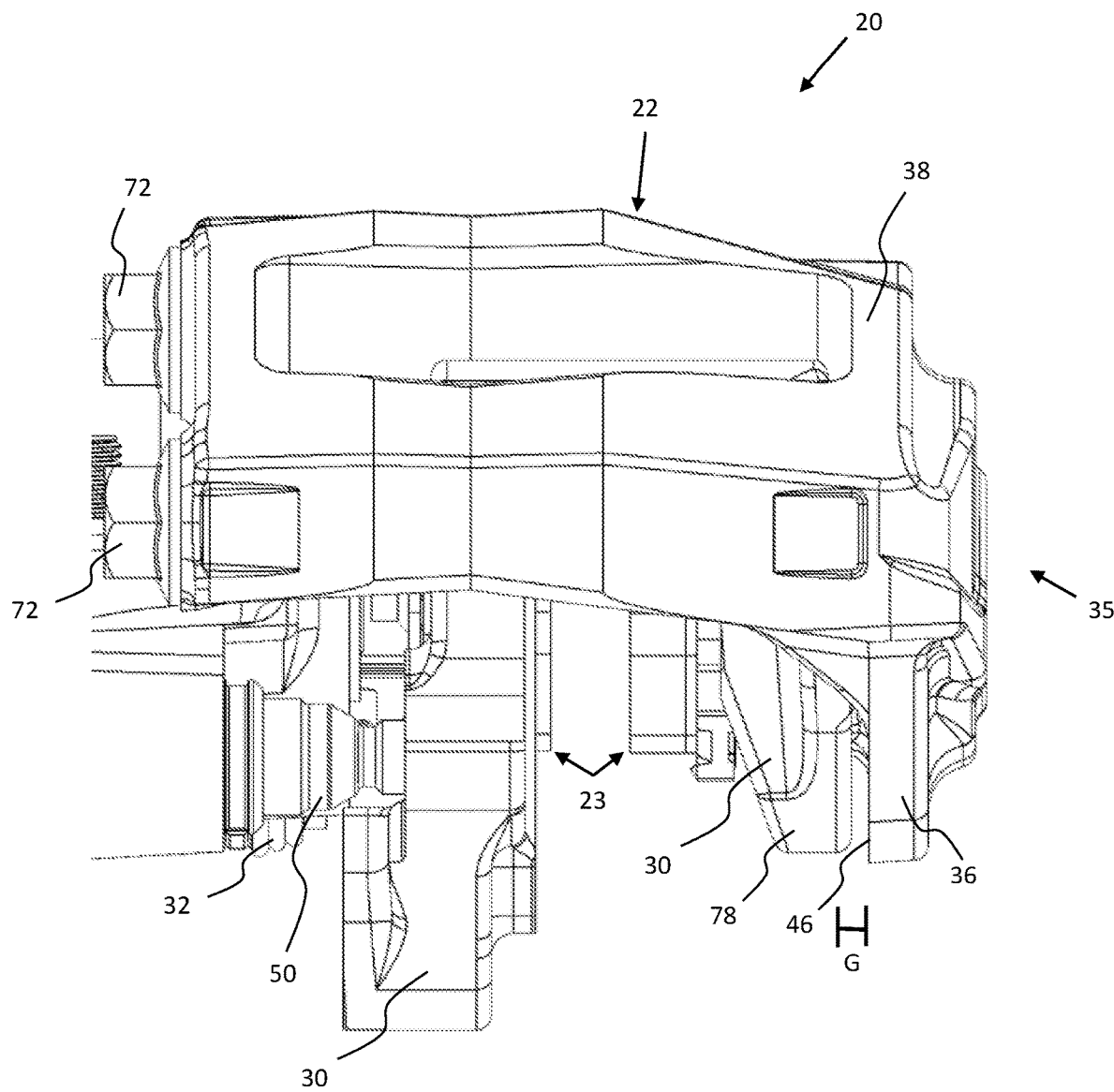
FIG. 6B is a side view of the brake assembly of FIG. 2 in a braking position.

FIGS. 6A and 6B illustrate a side view of the brake assembly 20 of FIG. 2 in a running position (i.e., a brake off position) and a braking position (i.e., a brake on position), respectively. The brake assembly 20 includes a pair of opposing brake pad assemblies 23 housing with a caliper housing 22. The caliper housing 22 includes a body portion 38 and an extended portion 36 that form a finger 35 of the caliper housing 22. The caliper housing 22 includes a plurality of fasteners 72 to secure sections of the caliper housing 22 to each other. The caliper housing 22 is supported by a plurality of guide pin assemblies 50 located within boots 32 and secured to the support bracket 30 located within the caliper housing 22, the guide pin assemblies 50 being slidably engaged to the caliper housing 22. The extended portion 36 further includes a recessed portion 46 inwardly facing a rotor positioned between the brake pad assemblies 23 and configured to receive a tie bar 78 of the support bracket 30 during movement of the caliper housing 22 (see FIGS. 5 and 7). As shown in FIG. 6A, the support bracket 30 is positioned in a running position so that the brake pad assemblies 23 are free of contact with the rotor. In the running position, a gap (G) exists between the tie bar 78 and the extended portion 36. As shown in FIG. 6B, when a clamping force is provided on the rotor via the brake pad assemblies 23 (i.e., in a braking position), the caliper housing 22 moves towards the support bracket 30 via the guide pin assemblies 50. As the caliper housing 22 moves towards the support bracket 30, the tie bar 78 of the support bracket 30 is received by the recessed portion 46, thereby decreasing a gap (G) between the tie bar 78 and the extended portion 36.

Figure 7:
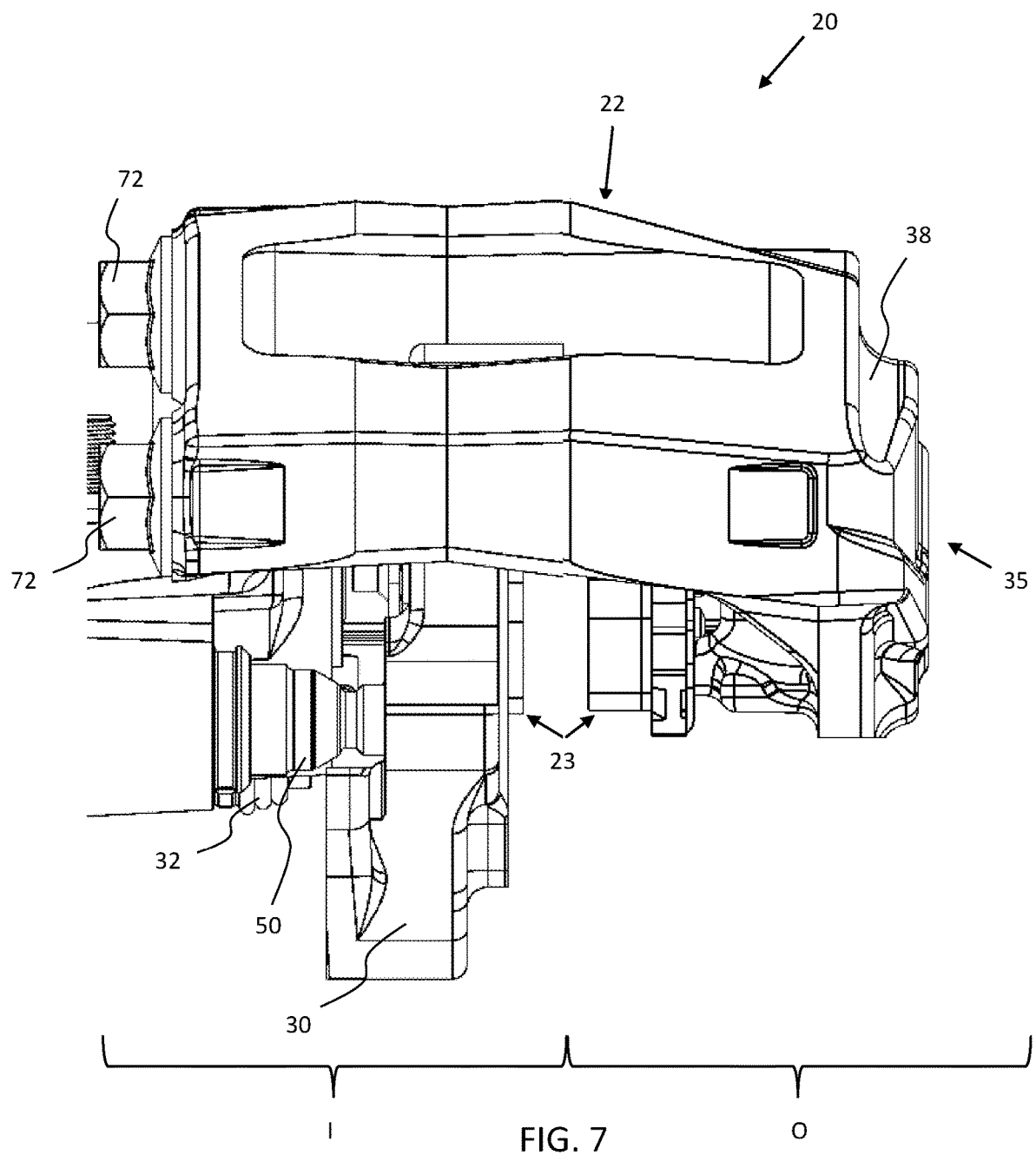
FIG. 7 is a side view of a brake assembly having a support bracket free of a tie bar.

FIG. 7 illustrates a side view of a brake assembly 20. The brake assembly 20 includes a pair of opposing brake pad assemblies 23 housed within a caliper housing 22. The caliper housing 22 includes a body portion 38 that forms a finger 35 of the caliper housing 22. The caliper housing 22 includes a plurality of fasteners 72 to secure sections of the caliper housing 22 to each other. The caliper housing 22 is supported by a plurality of guide pin assemblies 50 located within boots 32 and secured to a support bracket 30 located within the caliper housing 22, the guide pin assemblies 50 being slidably engaged to the caliper housing 22. As illustrated, the support bracket 30 is free of a tie bar along an outboard portion of the support bracket 30, and the body portion 38 of the caliper housing 22 obscures view of the support bracket 30 from an outboard side (O). Therefore, an outboard side (O) of the support bracket 30 is not visible when viewed from an outboard side (O) of the brake assembly 20 along an axis substantially coaxially with, or parallel to, an axis of rotation of a rotor (see FIG. 5, illustrating viewpoint (V)). It should be noted that an extended portion of the caliper housing 22 is not required to obscure view of the support bracket 30 (see conversely, FIGS. 6A and 6B, illustrating a support bracket 30 having a tie bar 78 obscured by an extended portion 36 of the caliper housing 22). It should also be noted that an inboard side (I)

of the support bracket 30 may be obscured from view by a rotor (not shown) positioned between the brake pad assemblies 23.

Figure 8:
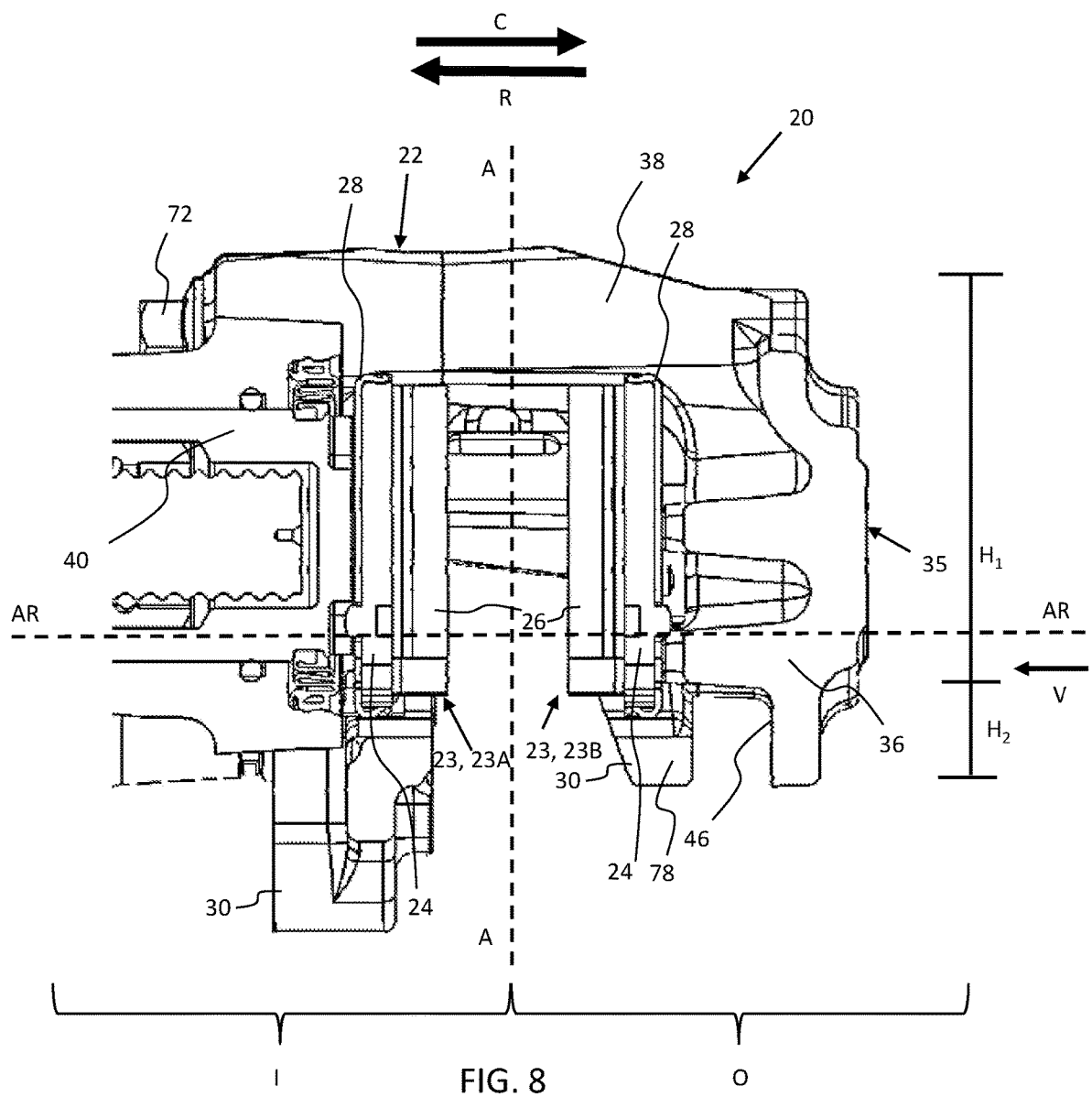
FIG. 8 is cross-sectional view VII-VII of FIG. 2.

FIG. 8 illustrates cross-sectional view VII-VII of the brake assembly 20 of FIG. 2. The brake assembly 20 includes a pair of opposing brake pad assemblies 23 housed within a caliper housing 22. The caliper housing 22 includes a body portion 38 and an extended portion 36 that form a finger 35 of the caliper housing 22. The caliper housing 22 includes a plurality of fasteners 72 to secure sections of the caliper housing 22 to each other. The caliper housing 22 is supported by a plurality of guide pin assemblies secured to a support bracket 30 located within the caliper housing 22 and slidably engaged to the caliper housing 22 (see FIG. 6). The extended portion 36 may have a height $H_2$ that is less than a height $H_1$ of the body portion 38. As illustrated, the extended portion 36 extends beyond the body portion 38 by the height $H_2$ so that an outboard side (O) of the support bracket 30, including a tie bar 78 of the support bracket 30, is not visible (V) when viewed from an outboard side (O) of the brake assembly 20 along an axis (AR) substantially coaxially with, or parallel to, an axis of rotation of a rotor. It should be noted that an inboard side (I) of the support bracket 30 may also be hidden from the aforementioned viewpoint by the rotor positioned between the inboard side (I) and the outboard side (O) of the support bracket 30 along axis (A). The extended portion 36 further includes a recessed portion 46 facing the rotor and configured to receive a portion of the support bracket 30 during movement of the caliper housing 22. Each brake pad assembly 23 includes a friction material 26 disposed on a pressure plate 24 and aligned via a shim 28, a pad clip, or both. The brake pad assemblies 23 oppose one another so that, as a piston 40 engages a first brake pad assembly 23A, the first brake pad assembly 23A moves towards a rotor (not shown) in a clamping direction (C). Once the first brake pad assembly 23A engages the rotor, the caliper housing 22 slides along the plurality of guide pin assemblies so that a second brake pad assembly 23B pushed by the caliper housing 22 moves toward an opposing side of the rotor, thereby providing a clamping force on the rotor between the brake pad assemblies 23 (see FIGS. 5 and 6). As the piston 40 releases engagement of the first brake pad assembly 23A, the brake pad assemblies 23 move back toward their original starting position, whereby the first brake pad assembly 23A moves in a release position (R). The brake pad assemblies 23 are secured within the support bracket 30. The brake pad assemblies 23 are configured to slide within the support bracket 30.

Figure 9:
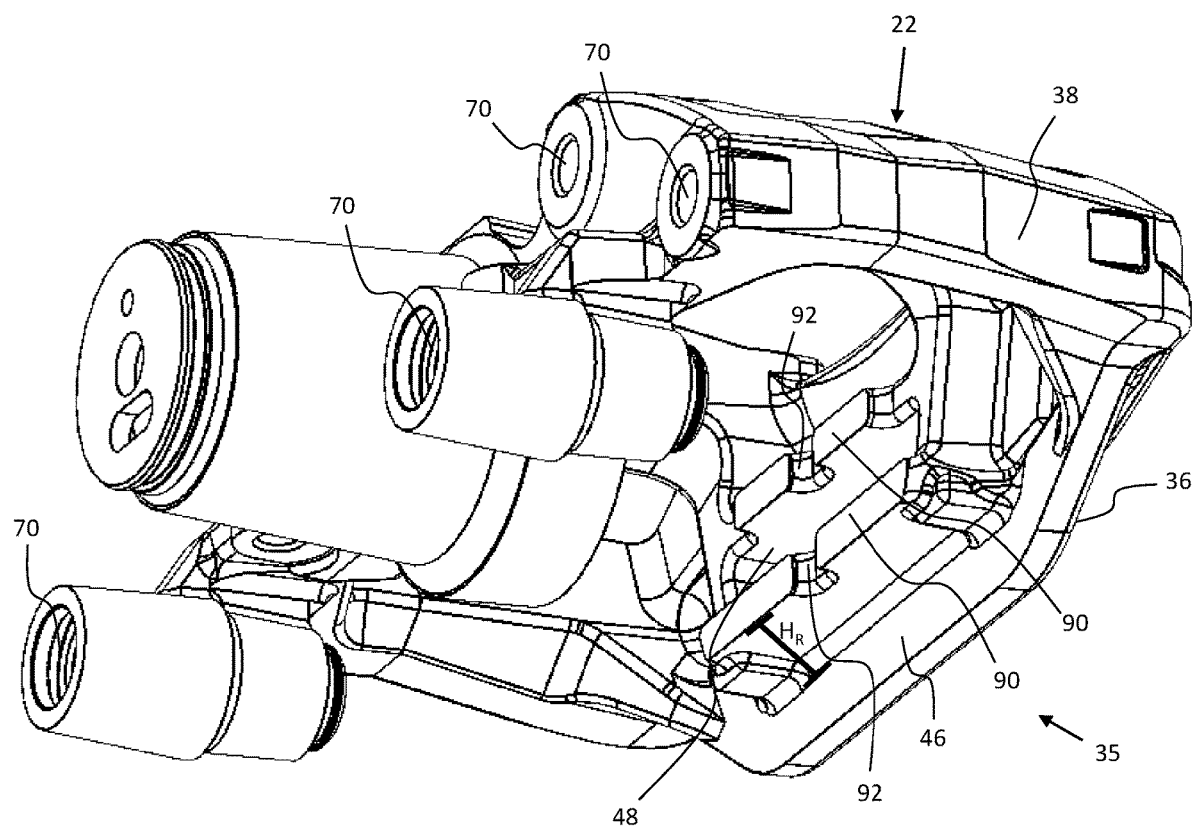
FIG. 9 is a bottom perspective view of a caliper housing.

FIG. 9 is a bottom perspective view of a caliper housing 22. The caliper housing 22 includes a body portion 38 and an extended portion 36 that form a finger 35 of the caliper housing 22. The extended portion 36 includes a recessed portion 46 configured to receive a portion of a support bracket during movement of the caliper housing 22 (see FIG. 8). The recessed portion 46 is located adjacent to a plurality of ribs 90 that form a hollow region 48 of the caliper housing 22. Each rib 90 includes a cutout 92 and a height ($H_R$). The height ($H_R$) of the ribs 90 correlates to a depth of the recessed portion 46 configured to receive an outboard portion of a support bracket (see FIGS. 6A and 6B). The caliper housing 22 further includes a plurality of holes 70 configured to receive a plurality of guide pin assemblies, a plurality of fasteners, or both.

Figure 10:
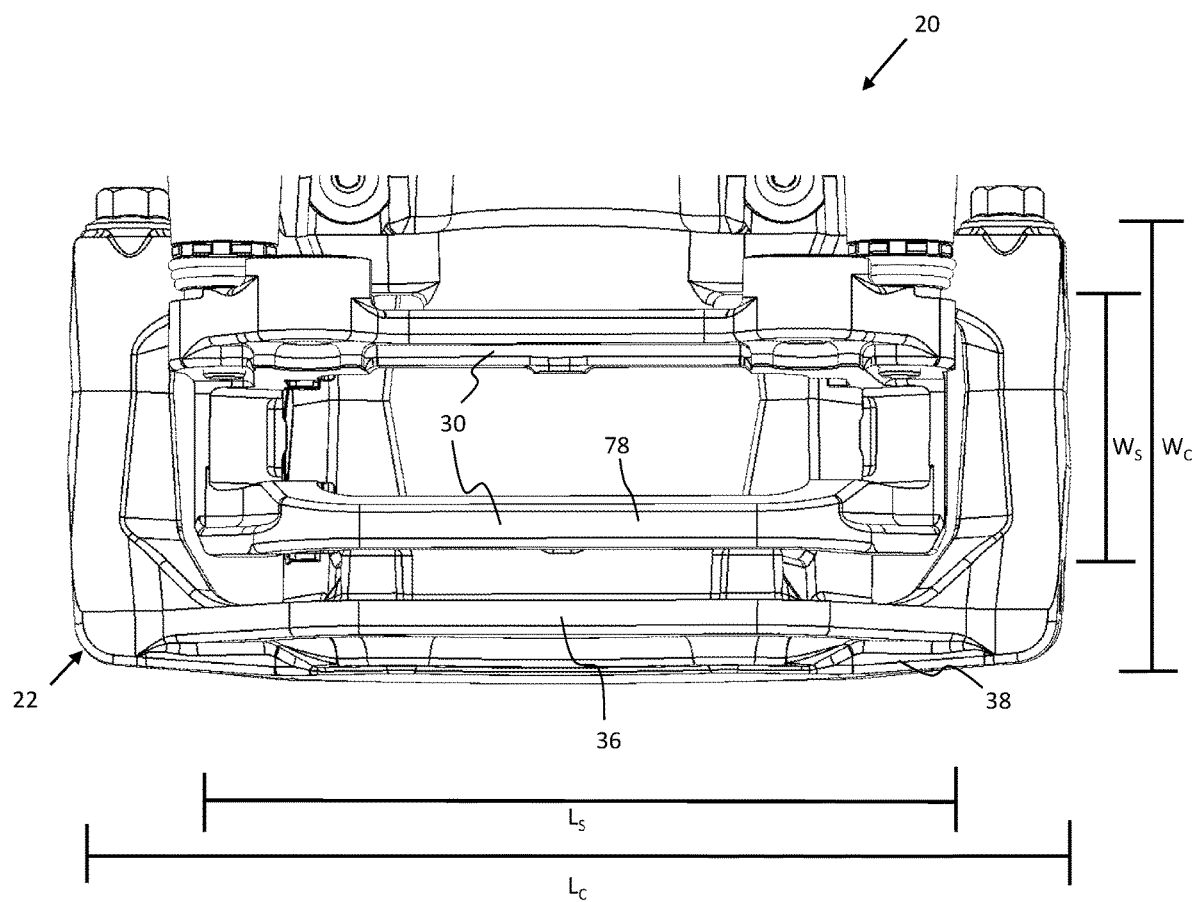
FIG. 10 is a bottom view of a partial brake assembly illustrating a support bracket secured in a caliper housing.
Figure 11:
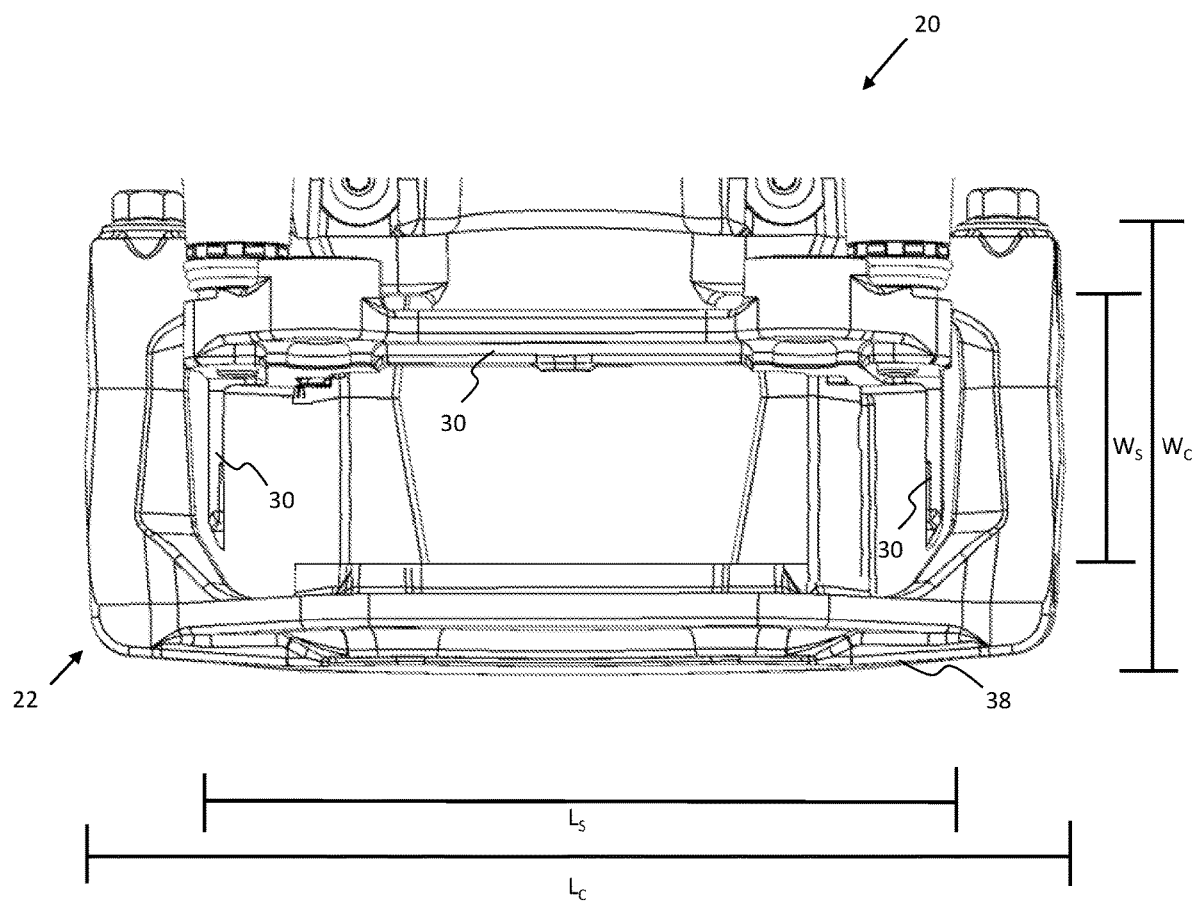
FIG. 11 is a bottom view of a partial brake assembly illustrating a support bracket free of a tie bar secured in a caliper housing.

FIGS. 10 and 11 are bottom views of partial brake assemblies 20, illustrating a support bracket 30 secured in a caliper housing 22. As shown, the support bracket 30 is positioned within an area of the caliper housing 22 so that the support bracket 30 is obscured from view when viewed from an outboard side of the brake assembly 20 (see FIGS. 3-8). A length of the caliper housing ($L_C$) is greater than a length of the support bracket ($L_S$). Similarly, a width of the caliper housing ($W_C$) is greater than a width of the support bracket ($W_S$). Because the length and width of the caliper housing 22 is greater than a length and width of the support bracket 30, an area of the support bracket may be positioned entirely within the confines of the caliper housing 22. As shown in FIG. 10, the caliper housing 22 includes a body portion 38 and an extended portion 36 extending from the body portion 38 to form a finger of the caliper housing 22 (see FIG. 5). The extended portion 36 obscures a tie bar 78 of the support bracket 30 from view when viewed from the outboard side of the brake assembly 20. Conversely, as shown in FIG. 11, the caliper housing 22 includes a body portion 38, but is free of an extended portion 36. Because the support bracket 30 is free of a tie bar 78, the support bracket 30 may be obscured from view when viewed from an outboard side of the brake assembly 20 without requiring an extended portion 36 extending from the body portion 38.

ELEMENT LIST

20 Brake Assembly
22 Caliper Housing
23 Brake Pad Assembly
23A First Brake Pad Assembly
23B Second Brake Pad Assembly
24 Pressure Plate
26 Friction Material
28 Shim
30 Support Bracket
32 Boot
34 Pad Clip
35 Finger
36 Extended Portion
38 Body Portion
40 Piston
42 Depressed Region
44 Raised Region
46 Recessed Portion
48 Hollow Region
50 Guide Pin Assembly
52 Guide Pin
54 Head Portion
56 Head
58 Shaft Portion
60 Shaft
62 Flange
62A Guide Pin Flange
62B Sleeve Flange
64 Groove
66 Notch
68 Sleeve
70 Hole
72 Fastener
74 Cavity
76 Engaging Portion
78 Tie Bar
84 Protruding Surface
88 Pad Spring
90 Rib
92 Cutout
94 Wheel
96 Rotor 98 Bridge
100 Drive Unit
100A Motor Gear Unit (MGU)
R Release Direction (of First Brake Pad Assembly)
C Clamping Direction (of First Brake Pad Assembly)
D1 Diameter of Engaging Portion
D2 Diameter of Shaft
$H_1$ Height (of the Body Portion)
$H_2$ Height (of the Extended Portion)
$H_R$ Height (of Rib)
$L_S$ Length (of the Support Bracket)
$L_C$ Length (of the Caliper Housing)
$W_S$ Width (of the Support Bracket)
$W_C$ Width (of the Caliper Housing)
O Outboard Side
I Inboard Side
A Axis (Extending through the Rotor)
AR Axis (of Rotation of the Rotor)
DI Distance (Between Holes)
V Viewpoint
G Gap (Between the Support Bracket and the Extended Portion)

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

What is claimed is:

1. A floating caliper brake assembly comprising:
   a caliper housing that is movable between a brake on position and a brake off position;
   a support bracket at least partially enclosed by the caliper housing and configured to extend around a rotor of a vehicle, the caliper housing being in communication with and movable relative to the support bracket,
   wherein the caliper housing has one or more fingers that include a body portion and an extended portion extending from the body portion, the extended portion having a recessed portion configured to receive the support bracket during movement of the caliper housing, the extended portion further including one or more ribs forming a hollow region along an interior surface of the caliper housing; and
   wherein the one or more fingers extend radially downward and cover the support bracket so that when the brake assembly is viewed from an outboard side along an axis coaxial with, or substantially parallel to, an axis of rotation of the rotor, the support bracket is obscured from view.

2. The brake assembly according to claim 1, wherein an outboard portion of the support bracket is covered by the caliper housing and obscured from view, and an inboard portion of the support bracket is covered by the rotor and obscured from view along the axis coaxial with, or substantially parallel to, the axis of rotation of the rotor.

3. The brake assembly according to claim 1, wherein an area within the caliper housing is greater than an area of the bracket support so that the area of the support bracket is located within the area of the caliper housing.

4. The brake assembly according to claim 1, wherein an outboard portion of the support bracket is free of a tiebar.

5. A floating caliper brake assembly comprising:
   a caliper housing including:
      one or more fingers
      one or more piston bores;
      an inner area located between the one or more fingers and the one or more piston bores; and
   a support bracket positioned entirely within the inner area of a caliper housing, the caliper housing being slidable relative to the support bracket,
   wherein an outboard portion of the support bracket is not visible when the brake assembly is viewed along an axis substantially perpendicular to one or more brake pad assemblies secured within the support bracket, and the one or more brake pad assemblies abut one or more ribs projecting from an inner surface of the caliper housing.

6. The brake assembly according to claim 5, wherein the outboard portion of the caliper housing includes an extended portion extending from a body portion of the caliper housing to cover the support bracket positioned with the inner area of the caliper housing.

7. The brake assembly according to claim 6, wherein the extended portion comprises a recessed portion configured to receive the support bracket during movement of the caliper housing.

8. The brake assembly according to claim 6, wherein the extended portion is integrally formed with the body portion.

9. The brake assembly according to claim 5, wherein a height of an outboard portion of the caliper housing measured substantially parallel to the one or more brake pad assemblies is greater than a height of the outboard portion of the support bracket.

10. The brake assembly according to claim 5, wherein the axis substantially perpendicular to the one or more brake pad assemblies is coaxial with, or substantially parallel to, a piston secured in the caliper housing.

11. The brake assembly according to claim 5, wherein the caliper housing comprises two or more portions secured together.

12. The brake assembly according to claim 5, wherein the caliper housing is a single, integrally formed structure.

13. A floating caliper brake assembly comprising: a support bracket secured within a caliper housing, the caliper housing being slidably engaged to the support bracket, wherein an outboard portion of the support bracket is hidden by an outboard portion of the caliper housing when the brake assembly is viewed along an axis substantially perpendicular to one or more brake pad assemblies secured within the support bracket, and wherein the outboard portion of the caliper housing includes a recessed portion configured to receive the support bracket during movement of the caliper housing, and the caliper housing further includes one or more ribs projecting from an inner surface that are configured to abut the one or more brake pad assemblies.

14. The brake assembly according to claim 13, wherein the outboard portion of the support bracket is substantially hidden by an extended portion of the outboard portion of the caliper housing, the extended portion extending from a body portion of the outboard portion of the caliper housing.

15. The brake assembly according to claim 13, wherein the support bracket is fixedly secured to a vehicle and the caliper housing slidably moves relative to the support bracket via one or more guide pin assemblies.

16. The brake assembly according to claim 13, wherein the support bracket includes a plurality of holes configured to receive one or more guide pin assemblies, one or more fasteners, or both, and the plurality of holes are located on a depressed region of the support bracket, a raised region of the support bracket, or both.

17. The brake assembly according to claim 13, wherein an area within the caliper housing is greater than an area of the bracket support so that the area of the support bracket is located within the area of the caliper housing.

* * * * *